United States Patent [19]

Saita et al.

[11] 3,917,932

[45] *Nov. 4, 1975

[54] GENERATION OF DIGITAL FUNCTIONS

[75] Inventors: Nobuo Saita; Yoichi Tanaka, both of Iruma, Japan

[73] Assignee: Kabushiki Kaisha Yaskawa Denki Seisakusho, Tokyo, Japan

[ * ] Notice: The portion of the term of this patent subsequent to Oct. 2, 1990, has been disclaimed.

[22] Filed: June 11, 1973

[21] Appl. No.: 368,533

Related U.S. Application Data

[63] Continuation of Ser. No. 127,289, March 23, 1971, Pat. No. 3,763,363.

[30] Foreign Application Priority Data

| | | |
|---|---|---|
| Mar. 24, 1970 | Japan | 45-25093 |
| Mar. 27, 1970 | Japan | 45-26190 |
| Apr. 9, 1970 | Japan | 45-30967 |
| Sept. 19, 1970 | Japan | 45-82403 |

[52] U.S. Cl. ............ 235/152; 235/151.11

[51] Int. Cl.[2] ............ G06F 15/46

[58] Field of Search ............ 235/152, 151.11

[56] References Cited

UNITED STATES PATENTS

| | | | |
|---|---|---|---|
| 3,254,203 | 5/1966 | Kveim | 235/152 |
| 3,555,253 | 1/1971 | Seki | 235/151.11 |
| 3,564,595 | 2/1971 | Deflorio et al. | 235/151.11 |
| 3,591,780 | 6/1971 | Rosenfeld | 235/152 X |
| 3,763,363 | 10/1973 | Saita et al. | 235/152 |

*Primary Examiner*—David H. Malzahn
*Attorney, Agent, or Firm*—Fitzpatrick, Cella, Harper & Scinto

[57] ABSTRACT

A method and system for determining the advance of a curve to be created on an X–Y plane, wherein the distances X and Y between the current position of the curve and a specific point assumed in correspondence with the nature of the curve and along the x-axis and the y-axis of the plane are utilized. The large-small relationship of the pulse distribution densities to the axes is decided from the large-small relationship of X and Y. As a result of this decision, the axis of higher pulse distribution density is distributed with pulses and a decision is made whether or not to simultaneously apply pulses to the other axis according to the qualitative value (positive, negative, or zero) of the current operational result Δ as determined by the relationships:

Δ = (preceding operational result Δ') + (difference between X and Y) or

Δ = (preceding operational result Δ') −(the smaller of X and Y).

At the same time, by fixing the specific point or by moving it in correspondence to the advancing curve, functions corresponding to straight lines, arcs, parabolas, hyperbolics, ellipses, spirals, group circles, exponential curves, logarithmic curves, and other figures can be generated in a simple manner.

10 Claims, 74 Drawing Figures

(STEP 2)

FIG. 55
A=0 B=0 A=0 B=0
0° 90° 180° 270° 360°
| | | | | | |
|---|---|---|---|---|---|
| SERIES TOLERANCE | x AXIS | −1 | +1 | −1 | +1 |
| | y AXIS | +1 | −1 | +1 | −1 |
| DIRECTION OF ADVANCE | x AXIS | POSITIVE | | NEGATIVE | |
| | y AXIS | POSITIVE | NEGATIVE | | POSITIVE |
FIG. 56
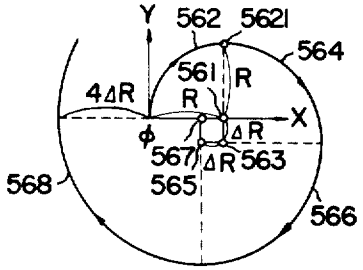
FIG. 60
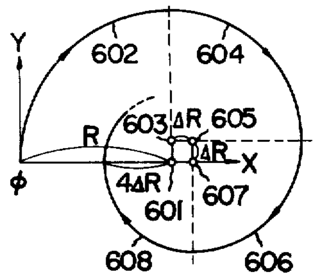
FIG. 57
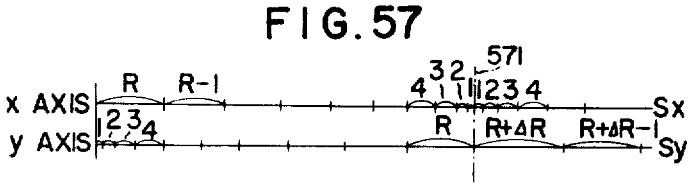
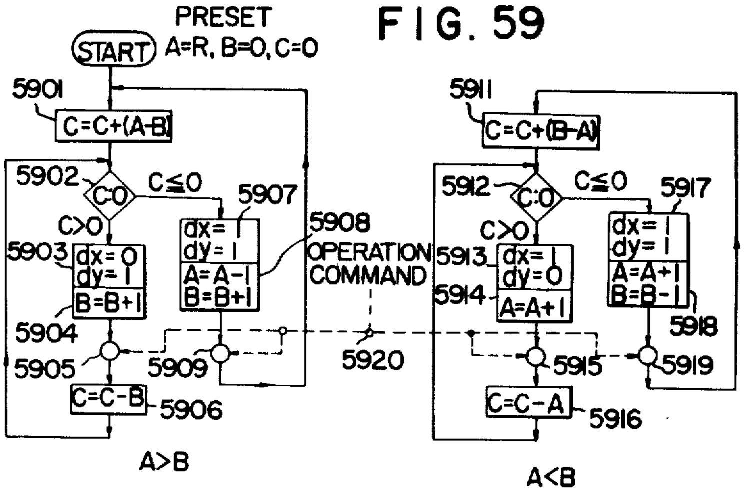
FIG. 59

ROTATION TYPE

TRANSLATION TYPE

WHERE $\Delta A \cdot x^2 + 2A_0 \cdot x = \Delta B \cdot y^2 + 2B_0 \cdot y$

GENERATION OF DIGITAL FUNCTIONS

This application is a continuation of applicants' prior application, Ser. No. 127,289, filed on March 23, 1971, and now issued as U.S. Pat. No. 3,763,363.

BACKGROUND OF THE INVENTION

This invention relates to digital function generation particularly for numerical control of work processes.

While a number of methods such as the so-called MIT (extraction of non-carrier pulses of a counter) method, DDA (extraction of overflow pulses of a digital integrator) method, and the algebraic computation (computation of algebraic discrimination type) method have heretofore been known for digital function generation, there has been none which occupies a position of absolute dominance for numerical control. That is, control of pulse distribution velocity, correction of the functions corresponding to a cutting tool, and, of course, smoothness of the interpolation effect are required in numerical control, and the total hardware necessitating computation of segment lengths and radii with respect to these requirements is caused to be complicated.

This invention is a creative result of technical thinking which is a complete departure from established concepts and affords the advantageous features of: (1) elimination of effects on the pulse distribution velocity due to the kind and magnitude of the function; (2) interpolation effect of curves due to pulses which are smoother than that of any known technique; (3) marked simplification of the hardware; and (4) the possibility of freely generating, by gate operations, functions of straight lines, arcs, parabolas, hyperbolas, ellipses, spiral curves, group circles, logarithmic curves, exponential curves, and other curves.

SUMMARY OF THE INVENTION

According to the present invention, briefly summarized, there is provided a method wherein, as a result of intensive investigation into the basic characteristics of curves in a plane, a specific center is determined for tracking of a curve by digital pulse distribution, this center point being fixed or caused to move, and a large number and variety of functions are generated in accordance with rotations about this center point or translational movement.

The basic principle of the pulse distribution according to the invention resides, in the progressive generation of a curve in a plane of $x$, $y$ coordinate axes by pulse distribution in the direction of both axes, in the continual taking of the axis of higher pulse distribution density as a standard and effecting a decision as to whether or not to distribute pulses in the direction of the axis of lower pulse distribution density.

By the practice of this invention, the hardware therefor becomes concise and economical, and the software is simplified. Furthermore, the resulting error in curve tracking is within one quantized unit whereby it is possible to generate functions of higher precision than those of various apparatus involving digital function generators heretofore known in the art.

The nature, principle, and utility of this invention will be more clearly apparent from the following detailed description with respect to preferred embodiments of the invention when read in conjunction with the accompanying drawings, in which like parts are designated by like reference numerals and characters.

BRIEF DESCRIPTION OF THE DRAWINGS

In the drawings:

FIGS. 16 and 17 are graphical representations and FIG. 18 is a block diagram for a description of the determination of pulse distribution for hyperbolic tracking and hardware therefor;

FIGS. 19, 20(*a*) and 20(*b*) are graphical representations and FIG. 21 is a block diagram for a description of the determination of pulse distribution for elliptical tracking and the hardware therefor;

FIG. 55 is a table, FIGS. 56, 57, and 60 are graphical representations, and FIGS. 58 and 59 are block diagrams for a description of the pulse distribution for generation of functions of spiral configuration according to this invention and of the hardware and software therefor;

DETAILED DESCRIPTION OF THE INVENTION

When a two-dimensional function $F(x,y) = 0$ is considered, it is apparent that while it is necessarry to maintain a specific relationship between the independent variables $x$ and $y$ thereof, the relationship between $x$ and $y$ can be divided by introducing thereinto a third parameter $t$ into two functions, namely, ($t$ and $x$) and ($t$ and $y$).

A feature of this invention is that by representing these two divided functions by respective independent arithemetic progressions or series and specifying the first term thereof and tolerance, any of various curves such as straight lines, arcs, parabolas, hyperbolas, ellipses, spiral curves, and group circles are digitally generated within an error range of one quantized unit. Furthermore, certain curves such as logarithmic curves and exponential curves which cannot be represented by arithmetic series can also be generated by the same technique. The manner in which these functions are generated in accordance with the invention will become apparent as the following detailed description progresses.

Figure 1:
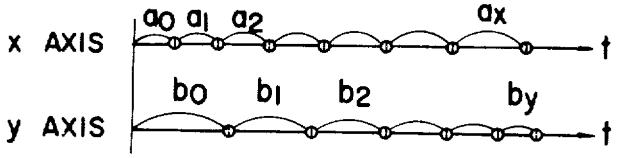
FIGS. 1, 2, and 3 are graphical representations for an explanation of the fundamental principle of this invention.

FIG. 1 graphically illustrates a series $a_0$, $a_1$, $a_2$, . . . ., $a_x$ having a first term $a_0$ and representing the relationship between the independent variable $x$ and the parameter $t$ and a series $b_0$, $b_1$, $b_2$, . . . ., $b_y$ having a first term $b_0$ and representing the relationship between the independent variable $y$ and the parameter $t$. In this figure, the symbols 1, each consisting of a circle with a vertical diametric line, indicate the pulse distribution, and each of the terms in the two series corresponds to a respective one of the pulses.

By taking the variation of the independent variables x and y corresponding to the distribution of one pulse as one quantized unit, the following equations of relationships are obtained.

$$t \approx a_0 + a_1 + a_2 + .... + a_x$$

$$= \sum_{i-0}^{x} a_i, \qquad \text{(Eq. 1)}$$

where $i = 0, 1, 2,$ .........

$$t \div b_0 + b_1 + b_2 + . \; . \; . + b_y$$

$$= \sum_{j=0}^{y} b_j, \qquad \text{(Eq. 2)}$$

where $j = 0, 1, 2,$ .........

Figure 2:
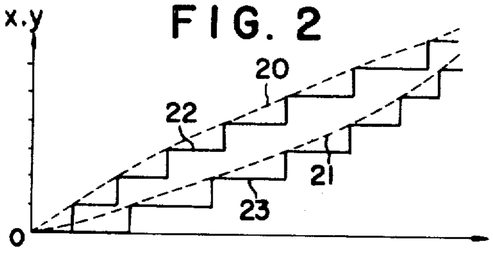
Figure 3:
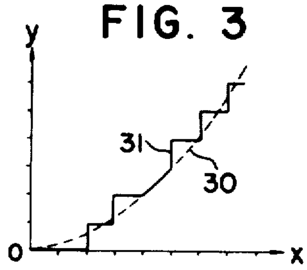

When plotted with respect to $x,t$ and $y,t$ axes, Eq. 1 and Eq. 2 appear as indicated in FIG. 2 by discontinuous or zigzag lines 22 and 23, respectively, the envelopes of which are intermittent lines 20 and 21. The relationship between the independent series x and y which results when the parameter $t$ is eliminated from FIG. 2 is indicated in FIG. 3. That is, since $t$ is a common parameter in Eq. 1 and Eq. 2, the first function F $(x,y) = 0$ is generated digitally by causing the terms of the two series to progress as the sums of the two series are maintained equal. In addition, the principle of function generation is indicated wherein the relationship $$\sum_{i=0}^{x} a_i \approx \sum_{y=0}^{y} b_y \qquad \text{(Eq. 3)}$$

is obtained by causing each term of the above series to correspond to the variation of a quantized unit.

The intermittent line 30 in FIG. 3 corresponds to the intermittent lines 20 and 21 in FIG. 2, while the zigzag line 31 corresponds to the zigzag lines 22 and 23. When the pulse distribution indicated in FIG. 1 exists, these zigzag lines in FIGS. 2 and 3 are presumed to respond promptly to a variation in the quantized unit without a delay in a pulse.

In FIG. 1, the auxiliary variable t is represented by the sum of the series, and the symbols 1 indicating the pulse distribution are disposed at the ends of their respective terms. The positions at which the symbols 1 are disposed may be selected at will within the limits of their respective terms. Furthermore, pulse distribution is not effected when the value of a term is zero.

Figure 4:
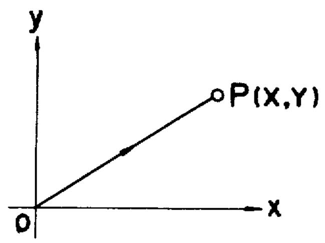
FIGS. 4, 5, 6(*a*) and 6(*b*) are graphical representations
Figure 5:
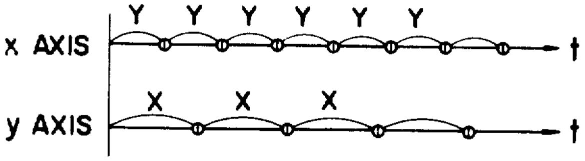

A straight line is generated in a manner as indicated in FIGS. 4 and 5. In the case where linear interpolation is to be carried out from an origin O to a point P (X,Y) as indicated in FIG. 4, the series of the X and Y axes are selected in the following manner.

$X$-axis series ....... arithmetic progression of first term $= Y$ and tolerance $= 0$.

$Y$-axis series ....... arithmetic progression of first term $= X$ and tolerance $= 0$.

The relationships under these conditions between the independent variable X and the parameter $t$ and between the independent variable Y and the parameter $t$ are indicated in FIG. 5, the relationship equations being as follows.

$$x\text{-axis} \dots t \approx \sum_{i=0}^{x} a_i = Y \cdot x \qquad \text{(Eq. 4)}$$

$$y\text{-axis} \dots t \approx \sum_{j=0}^{y} b_j = X \cdot y \qquad \text{(Eq. 5)}$$

When $t$ is eliminated from Eqs. 4 and 5, the following equation is obtained.

$$Y.x \approx X.y \qquad \text{(Eq. 6)}$$

This represents a straight line passing through P (X,Y). That is, in order to reach the point P from the origin O, the speed not being a problem, the time axis in the $x$ direction and that in the $y$ direction are divided by Y and X, respectively, thereby to effect pulse distribution, whereby, when the time of starting of distribution is taken as zero, the objective position P is reached at time X.Y. For example, if it is assumed that P (X,Y) in FIG. 4 is P (8,5) and that the time axis is divided by $\mu$ seconds, then the X axis is divided by Y (5 $\mu$ seconds) while the Y axis is divided by X (8 $\mu$ seconds). That is, 8 pulses are applied to the X axis every 5 $\mu$ seconds, while 5 pulses are applied to Y axis every 8 $\mu$ seconds, so that the time duration for movement from the origin to the point P (8,5) is $8 \times 5 = 40$ ($\mu$ seconds). This method is indicated in FIG. 5. While this method is of ideal nature, it requires counting of the X and Y scales by some method for the purpose of dividing the time axes.

Furthermore, since the pulse distribution velocity is affected directly by the values of X and Y, it cannot be used directly in this state for numerical control. Furthermore, the interpolation accuracy exceeds the quantized unit and excessively contains waste. Accordingly, the axis of higher pulse distribution density (for example, the $x$ axis in FIG. 5) is taken as a standard, and when pulses are imparted to this axis, the decision as to whether or not to impart pulses to the other is successively made.

Through our observation and utilization of this point, this invention affords the three advantageous features of simplification of the hardware, facilitation of the pulse distribution velocity, and smoothening of the interpolation result. If the axis of lower pulse distribution density were to be selected as a standard, it would probably be even necessary to decide as to the number of pulses to be distributed to the other axis.

Figure 6A:
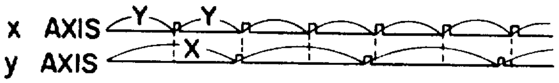
Figure 6B:
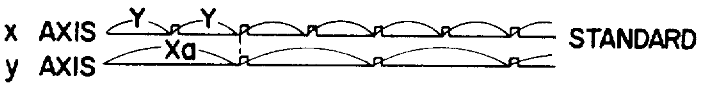

The manner in which this decision is made is indicated in FIGS. 6($a$) and 6($b$). That is, this decision is made by observing the presence or absence of pulses of the $y$ axis within the pulse intervals of the $x$ axis, which is to be the standard in this case. FIG. 6($a$) indicates the pulse distribution when the pulses are distributed independently in the $x$ and $y$ axes, respectively, without entailing decision function, while FIG. 6($b$) indicates that when the $x$ axis is selected as the standard, and decision function is applied.

Figure 7:
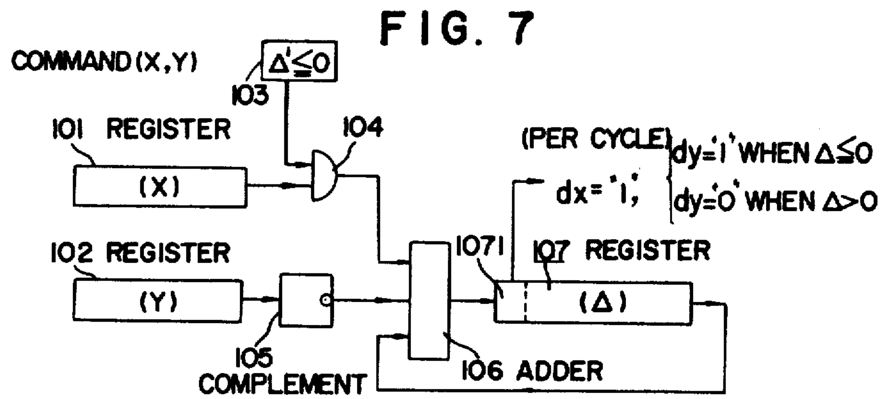
FIGS. 7 and 8 are block diagrams for a description of the determination of pulse distribution for linear tracking and the hardware and software therefor.

One example of hardware suitable in this case is illustrated as a block diagram in FIG. 7. This hardware comprises registers 101 and 102, in which value X and value Y are respectively preset, a gate circuit 104, a condition-setting circuit 103 for determining the ON-OFF condition of the gate 104, a complement circuit 105, an adder circuit 106, and a register, within which 1071 is a coder for the result $\Delta$ of computation of the adder circuit 106. The pulse distributed in the $x$ axis is denoted by $dx$, while that distributed in the y axis is denoted by $dy$, and the presence and absence of a distributed pulse are indicated by 1 and 0, respectively.

Figure 8:
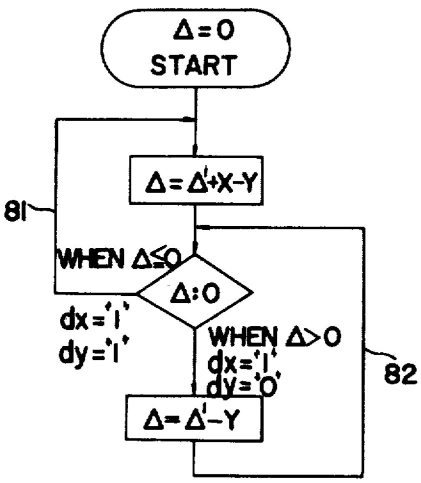

The operational flow in this example is indicated in FIG. 8. Since the initial condition is $\Delta = 0$, the operation X–Y is first carried out in the circuit 106, and a new result $\Delta$ enters the register 107. Since it is assumed in FIGS. 4 through 8 that X>Y, the result of the first code discrimination becomes $\Delta > 0$ and passes through loop 82, whereby the pulse $dx$ distributed in the $x$ axis becomes 1, while the pulse dy distributed in the $y$ axis becomes 0.

The first pulse distribution in FIG. 6 ($b$) is applicable to this result. After completion of operation of the loop 82, the code $\Delta$ is again discriminated, and the result of the second code discrimination becomes $\Delta < 0$ and passes through loop 81, whereby the distributed pulse $dx$ in the $x$ axis becomes 1, and the distributed pulse $dy$ in the $y$ axis also becomes 1. The tracking element (not shown in any of the figures) which actually carries out linear interpolation advances along a path inclined 45° of angle relative to the two axes.

The second pulse distribution in FIG. 6($b$) corresponds to this result. Thereafter, the loop 81 or 82 is successively computed in accordance with code $\Delta$, and pulse distribution proceeds repeatedly. Accordingly, pulses of intervals Y are distributed along the $x$-axis constituting the standard, whereby the tracking element advances at constant velocity in that direction.

Figure 9:
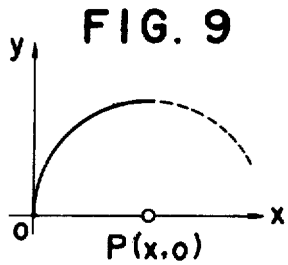
FIGS. 9, 10, and 11 are graphical representations
Figure 10:
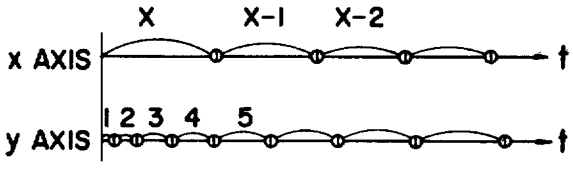

FIGS. 9 and 10 illustrate a case wherein an arc is generated. In this case wherein a clockwise arc is to be generated from an origin about a center P (X,O), as indicated in FIG. 9, the following conditions are suitable.

$x$-axis series ..... arithmetic progression of first term = X, and tolerance = −1.

$y$-axis series ..... arithmetic progression of first term = 0, and tolerance = + 1.

The reason for this is as follows.

The relationships between the independent variable X and the parameter $t$ and between the independent variable Y and the parameter $t$ are indicated in FIG. 10, the analytical relationships being $$x\text{ axis} \dots t \approx \sum_{i=0}^{x} a_i = \frac{X(X+1)}{2} - \frac{(X-x)(X-x+1)}{2} \qquad \text{(Eq. 7)}$$

$$y\text{ axis} \dots t \approx \sum_{j=0}^{y} b_j = \frac{y(y+1)}{2} \qquad \text{(Eq. 8)}$$

When $t$ is eliminated from Eqs. 7 and 8, the following equation is obtained.

$$X(X+1) - (X-x)(X-x+1) = y\,(y+1) \qquad \text{(Eq. 9)}$$

At the same time, since the values of X and Y are, in general, amply greater than the quantized unit, Eq. 9 can be approximated by $$(x-X)^2 + y^2 = X^2 \qquad \text{(Eq. 10)}$$

This represents an arc of a radius X with a center at point P (X,O).

On one hand, an arc having a center 111 of coodinates X, −Y and passing through the origin O will be considered. When pulses are distributed with linear interpolation from the origin O to the center 111, the operation proceeds as indicated by the intermittent line and arrow in FIG. 11. With arcuate interpolation, however, if the operation proceeds as indicated by the dot-and-dash line and arrow immediately after the start, the first pulse distribution necessary for arcuate interpolation is obtained. For this purpose, pulse distribution by linear interpolation as point 112 (Y, X) is carried out with respect to the command center 111 (X, −Y) of pulse distribution. If the operation proceeds in this state, however, it will actually proceed toward point 112 (Y,X), and, therefore, path correction is periodically carried out in the following manner.

1. After one pulse has been distributed in the x axis, value X is made value (X−1) (X → X−1).

Figure 12:
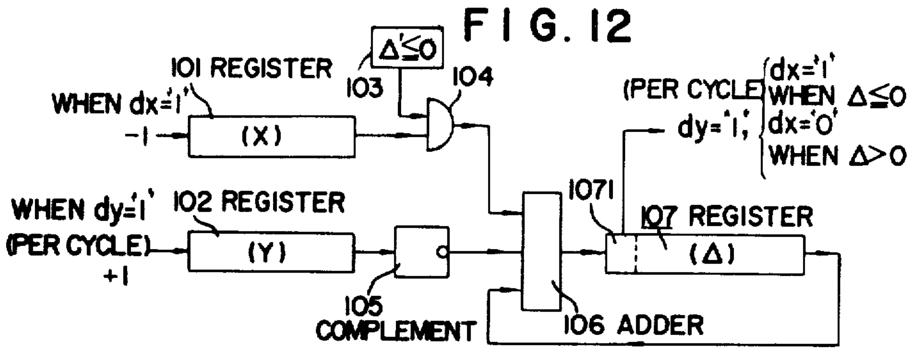
FIG. 12 is a block diagram for a description of the determination of pulse distribution for arcuate tracking and the hardware therefor.

2. After one pulse has been distributed in the y axis, value Y is made value (Y+1) (Y → Y+1). The quantity ± 1 here set forth is one quantized unit depending on the quadrant of the arc. This correction is a correction of the command center coordinates in accordance with shifting of the origin. Linear interpolation carried out as correction is effected, in other words, is equivalent to a command for advancement perpendicular to continually new center, coordinates, and the interpolation result becomes an arc. As for the hardware for pulse distribution of arcuate interpolation, it can be obtained by merely adding the function of ± 1 to the values X and Y of the registers 101 and 102 of the linear interpolation circuit shown in FIG. 7. This is indicated in FIG. 12.

The operation in this case conforms to that indicated in FIG. 8 except that the output $dy = 1$ in the direction of the y axis adds +1 to the value Y each time computation is carried out with adder circuit 106, that is, during each cycle. Furthermore, each time there is an output $dx = 1$ in the $x$-axis direction, −1 is added to value X of the register 101.

When the angle between the radius joining the center of the arc and the tracking element and the x axis becomes $\pi/4$, the large-small relationship of the registers 101 and 102 is reversed. While it was assumed that X>Y in the above description of the hardware and the operation thereof, when the large-small relationship is reversed, the axis to be the standard is automatically interchanged, and the inputs to the gate circuit 104 and the complement circuit 105 must be reversed. At the time of this reversal, accumulation of errors can be avoided by adding the function of applying the complement of the operational result Δ to the gate circuit 106. This is also true also in the case of the point 111 (X, −Y) shown in FIG. 11 which center is not on the $x$ axis.

Figure 13:
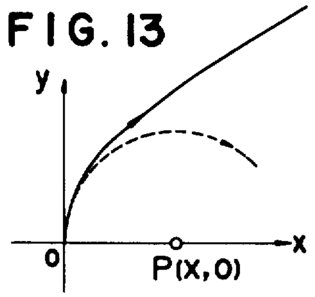
FIGS. 13 and 14 are graphical representations and FIG. 15 is a block diagram for a description of the determination of pulse distribution for parabolic tracking and the hardware therefor.
Figure 14:
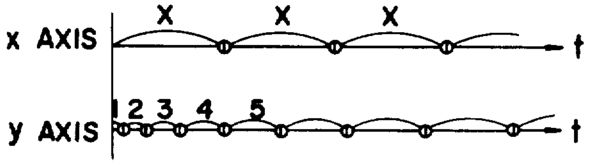

An example of generation of a parabola is indicated in FIGS. 13 and 14. If, in the arc $y^2 - 2Xx + x^2 = 0$ shown by intermittent line in FIG. 13 and having a center at fixed point P (X,O), the figure is opened from the $x$ axis, it becomes a parabola $y^2 - 2Xx = 0$. In this case, the following series are suitable and are indicated graphically in FIG. 14.

$x$-axis series .... arithmetic progression of first term = $X$ and tolerance = 0.

$y$-axis series .... arithmetic progression of first term = 0 tolerance = + 1.

The reason for this is as follows, similarly as in the previously described relationship equations.

$$x \text{ axis} \ldots\ t \approx \sum_{i=0}^{x} a_i = X.x \qquad \text{(Eq. 11)}$$

-continued $$y \text{ axis} \ldots\ t \approx \sum_{y=0}^{y} b_y = \frac{y(y+1)}{2} \qquad \text{(Eq. 12)}$$

By eliminating $t$ from the above Eqs. 11 and 12, the following relationship is obtained.

$$X \cdot x = \frac{y(y+1)}{2} \qquad \text{(Eq. 13)}$$

Therefore $y >> 1$ (that is, value Y is much greater than one quantized unit.)

Therefore, Eq. 13 can be approximated by the following equation.

$$y^2 = 2\,X.x \qquad \text{(Eq. 14)}$$

This is a parabola having a focus at point (X/2, O).

Figure 15:
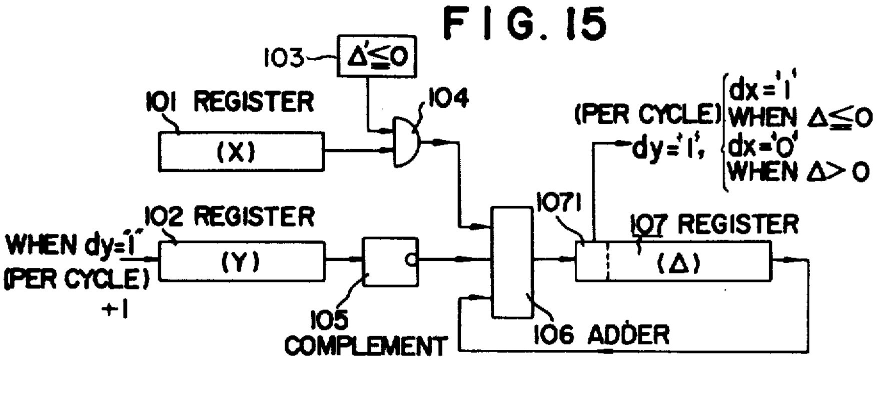

An example of hardware for pulse distribution for parabolic interpolation is indicated in FIG. 15 and has an organization which results from adding the function of +1 to value Y of the register 102 in the linear interpolation circuit shown in FIG. 7.

Figure 16:
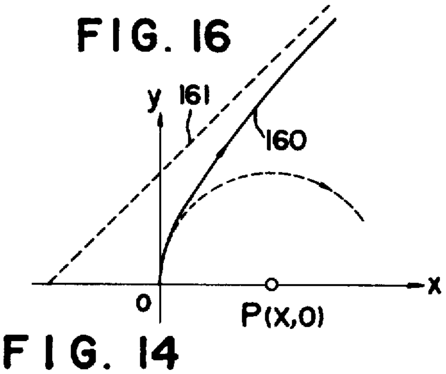
Figures 17, 18, 19, 20A, 20B, 21:
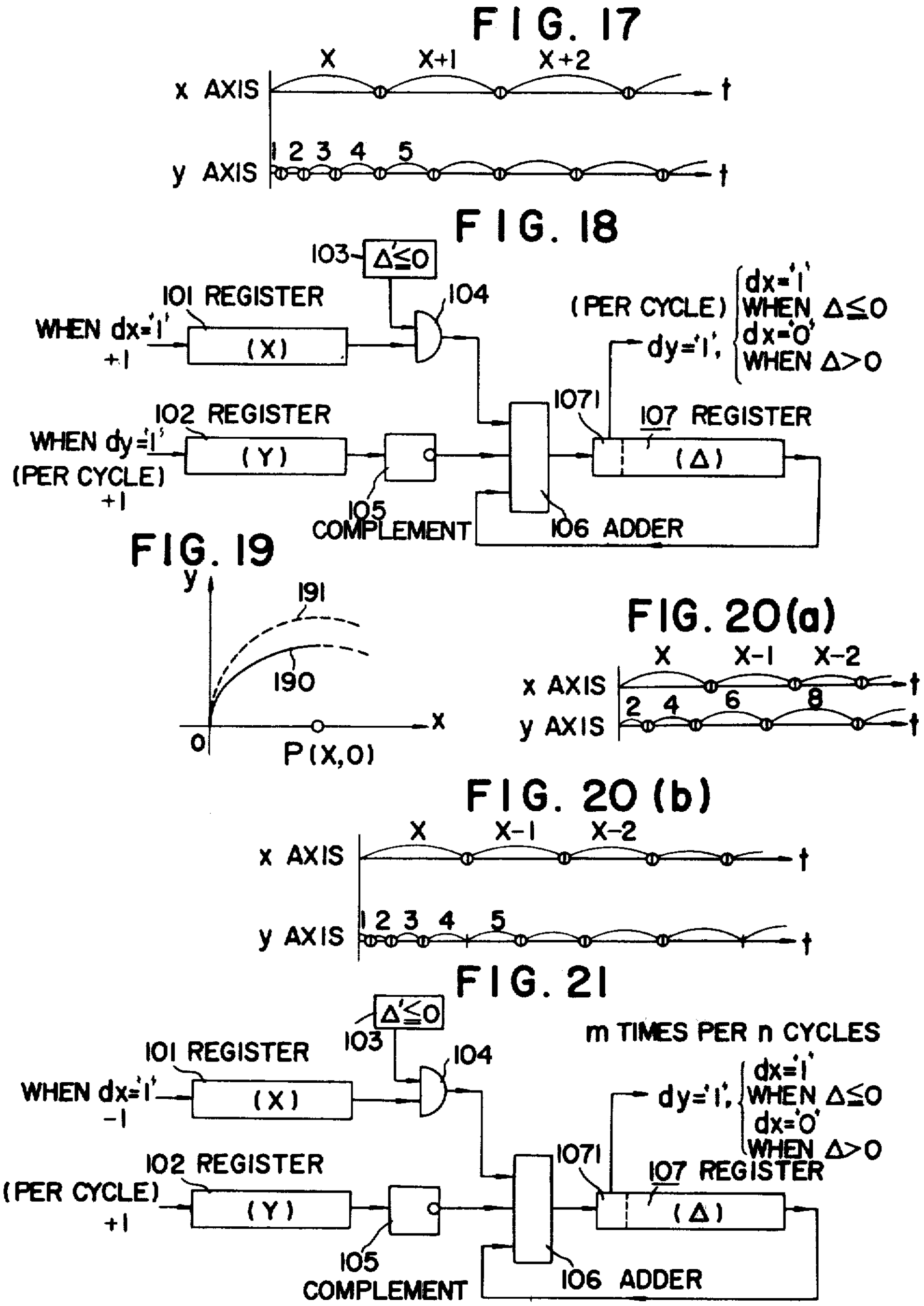

An example of generation of a hyperbola is illustrated in FIGS. 16 and 17. With respect to an arc $y^2 - 2Xx + x^2 = 0$ shown by intermittent line and having a center at fixed point P (X,O), similarly as in FIG. 13, a correction of +1 is carried out for the $x$ axis, oppositely to that for an arc. That is, the following series are suitable.

$x$-axis series .... arithmetic progression of first term = $X$, and tolerance = 1.

$y$-axis series .... arithmetic progression of first term = 0, and tolerance = 1.

The basis for this is as follows. From FIG. 17,

$$x \text{ axis} \ldots\ t \approx \sum_{i=0}^{x} a_i = \frac{(X+x-1)(X+x)}{2} - \frac{(X-1)X}{2} \qquad \text{(Eq. 15)}$$

$$y \text{ axis} \ldots\ t \approx \sum_{j=0}^{y} b_j = \frac{y(y+1)}{2} \qquad \text{(Eq. 16)}$$

By eliminating t from Eqs. 15 and 16, the following relationship is obtained.

$$(X+x-1)(X+x) - (X-1)X = y(y+1) \qquad \text{(eq. 17)}$$

Since X >> 1, Eq. 17 can be approximated by $$(x+X)^2 - y^2 = X^2 \qquad \text{(Eq. 18)}$$

This represents a hyperbola 160 with an asymptote 161.

An example of hardware for interpolation of a hyperbola is illustrated in FIG. 18.

An example of generation of an ellipse is indicated in FIGS. 19 and 20. As the same operation as that for arcuate interpolation of the arc 191 shown by intermittent line in FIG. 19 and having a radius X and a center at fixed point P (X,O) is repeatedly carried out, a correction of +2 is applied to the y axis, for example. Then, from FIG. 20($a$), the following equations are obtained.

$$x \text{ axis} \ldots\ t \approx \sum_{i=0}^{x} a_i = \frac{X(X+1)}{2} - \frac{(X-x)(X-x+1)}{2} \qquad \text{(Eq. 19)}$$

-continued $$y \text{ axis} \ldots\ t \approx \sum_{j=0}^{y} b_j = \frac{2y(2y+1)}{2} \quad \text{(Eq. 20)}$$

From these Eqs. 19 and 20 and the fact that $X >> 1$, the following approximation equation is obtained.

$$(x - X)^2 + (2y)^2 = X^2 \quad \text{(Eq. 21)}$$

This equation represents an ellipse.

The compensation for the register 102 which is carried out each time there is an output $dy = 1$ toward the $y$ axis may take any integral value $d$.

Alternatively, a technique wherein the pulses to be applied to the $y$ axis are applied only $m$ cycles out of n cycles as the arcuate interpolation operation is repeatedly carried out can also be resorted to. In this case, the ratio $m/n$ becomes the ratio of the minor axis to the major axis of the ellipse. For example, when the minor and major axes of the ellipse are orientated parallelly to the $y$ and $x$ axes, respectively and have a ratio ¾, a suitable procedure is to prevent one pulse distribution out of four to the $y$ axis as indicated in FIG. 20(*b*).

An example of appropriate hardware in this case is illustrated FIG. 21.

Figure 23:
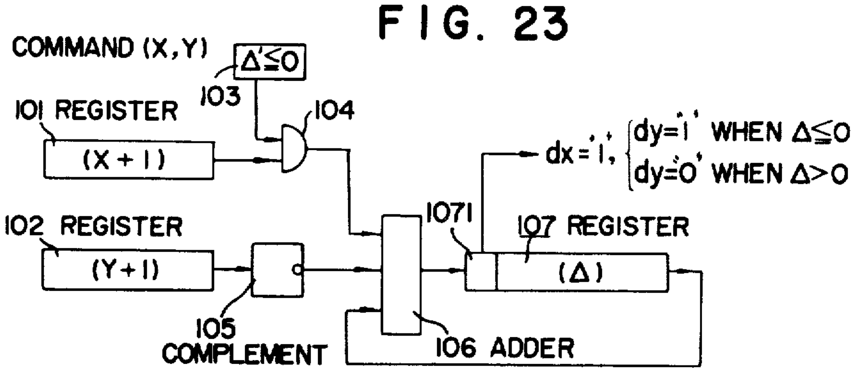
FIGS. 22 and 23 are respectively a graphical representation and block diagram indicating the manner in which a command value approaching the true value is imparted by the function generation according to this invention.
Figure 22:
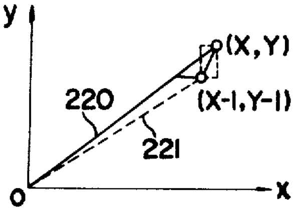

FIGS. 22 and 23 indicate a technique for obtaining approximations in interpolation according to this invention which are closer to the true values.

When a straight line such as line 220 in FIG. 22 is interpolated, the condition $dx = 1$, $dy = 1$ always becomes valid at a point which becomes a common multiple of the values X and Y. That is, the interpolation result passes through points (X,Y) and (X–1, Y–i). If, with the objective coordinates at point (X,Y), pulses are distributed directly in this state, a deviation will be produced in the direction nearer the standard axis although it is within one quantized unit.

Since passage through the point (X–1, Y–1) is certain, if this point is made the objective, the interpolation result will approach the true value even closer. More specifically, when the point (X,Y) is a command, an even better interpolation can be obtained by causing the value X to be (X+1) and the value Y to be (Y+1), carrying out a linear interpolation operation by the method described hereinbefore, and applying the results of pulse distribution up to point (X,Y) to both axes.

An example of hardware suitable for this purpose is illustrated in FIG. 23. This technique is not limited in application to only straight lines but can be applied to almost all figures such as arcs and parabolas.

Figures 24, 25, 26, 27:
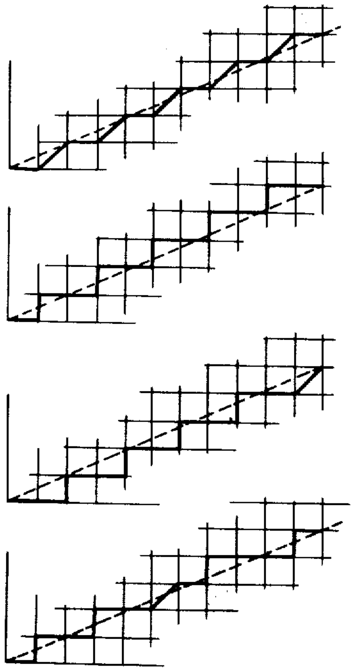
FIGS. 24 through 27, inclusive, are graphical representations for a comparison between the digital function generating system of this invention and three other like systems with respect to linear tracking.

The manner in which the pulse distribution result of the method of this invention approaches the true values closer than that of known methods is indicated in FIGS. 24 through 30. FIGS. 24 through 27 indicate the results of pulse distribution for linear interpolation. With respect to all methods, the registers are adapted for (1+4) bits, the first one bit being used for detection of code or overflow, and point (11,5) is applied as an objective command. FIG. 24 shows the pulse distribution according to this invention, FIG. 25 that according to an algebraic operation, FIG. 26 that according to a DDA method, and FIG. 27 that according to the M.I.T. method.

Figures 28, 29, 30, 34, 39, 40, 43, 44:
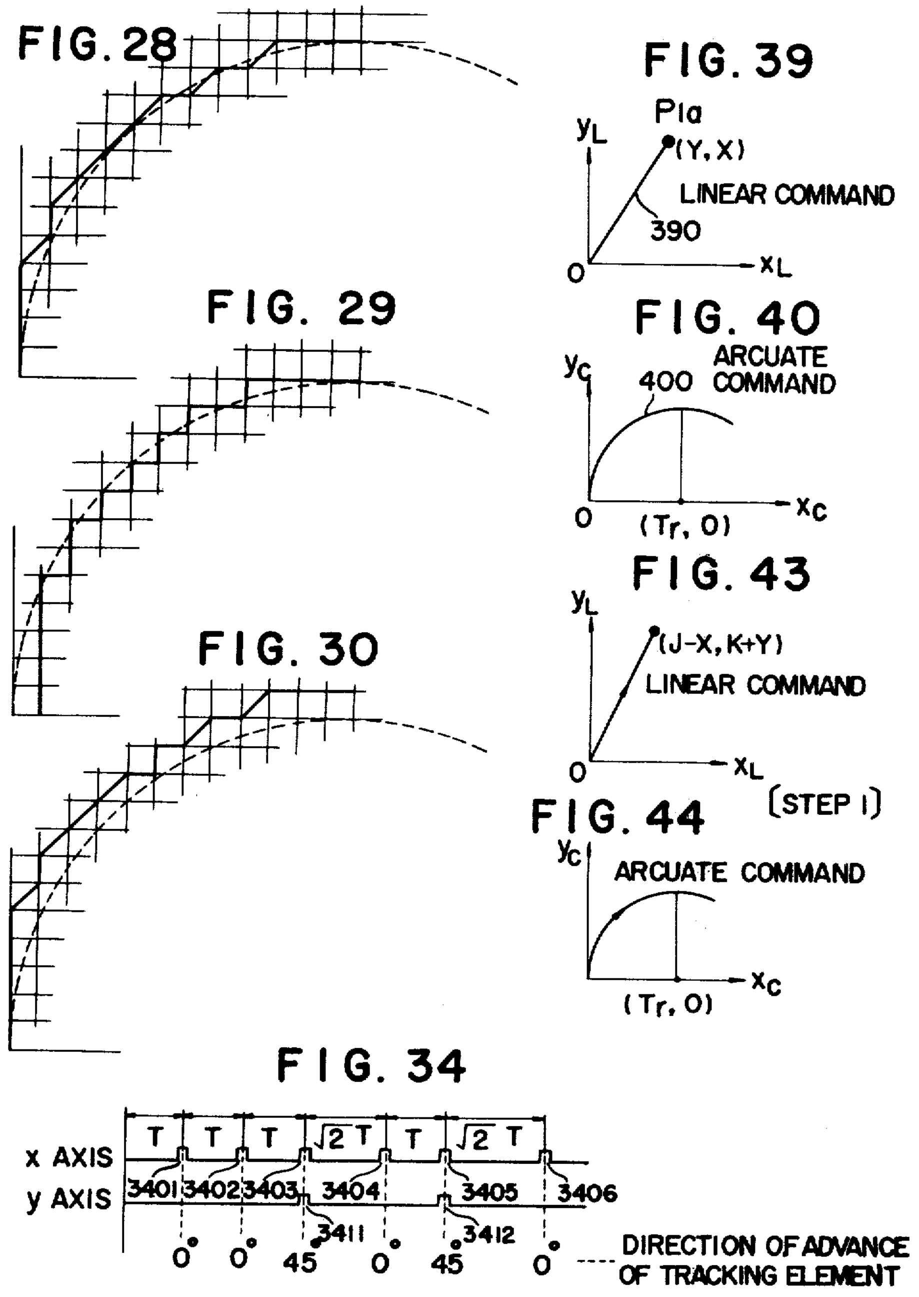
FIGS. 28, 29, and 30 are graphical representations for a comparison between the digital function generating system of this invention and two other like systems with respect to arcuate tracking.
FIGS. 39 and 40 are graphical representations.
FIGS. 43, 44, 46, and 47 are graphical representations.

FIGS. 28, 29, and 30 indicate the results of pulse distribution for arcuate interpolation. In this case, the registers are adapted as before, and the center coordinates are set at point (12,0), a clockwise command being applied. FIG. 28 shows the pulse distribution according to this invention, FIG. 29 that according to an algebraic operation technique, and FIG. 30 that according to a DDA method.

Next, the technique in this invention of controlling the velocity of a tracking element in correspondence with digital pulses will now be described.

Figure 31:
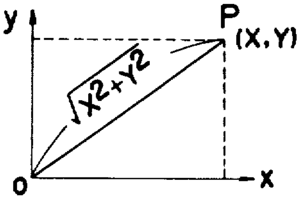
FIGS. 31, 32, 33, and 34 are graphical representations indicating a procedure for causing the velocity in pulse distribution to be constant in this invention.

Referring to FIG. 31, there is indicated a known technique whereby the velocity of a tracking element is caused to be constant. When the tracking element is tracking a straight line $\overrightarrow{OP}$, the velocity in the tangential direction is proportional to the segment length in the case of a method such as the DDA and M.I.T. methods. Accordingly, in order to obtain a constant velocity, computation of a quantity such as the segment length $(X^2 + Y^2)^{1/2}$ of the straight line $\overrightarrow{OP}$ is carried out to effect compensation. The hardware for this purpose, however, is considerably complicated.

Figure 32:
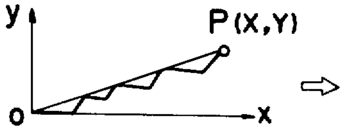
Figure 33:
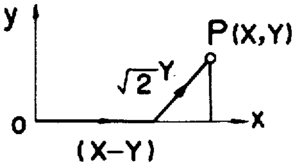

The fundamental principle of control of the velocity of the tracking element according to this invention is indicated in FIGS. 32 and 33 and is as follows.

By the organization and operation of means according to this invention one pulse can always be supplied for each cycle to either one of the axes, for example, the $x$ axis in the example shown in FIG. 32. Accordingly, if a pulse is supplied to the $y$ axis, the tracking element will assume a 45° direction, whereas if a pulse is not thus supplied, the tracking element will assume a 0° direction. Therefore, in accordance with this invention, since the velocity when the tracking element direction is 45° is $\sqrt{2}$ times that when the tracking element direction is 0°, the interval between the pulses to be successively distributed is made $\sqrt{2}$ times the normal interval.

More specifically, if, in FIGS. 32 and 33, the variation of the total traverse distance of the tracking elements thereof is to be indicated, and it is assumed that value $X \geq Y$ in P (X,Y), and that the standard pulse is applied to the $x$ axis, then the driving of the tracking element in the $x$-axis direction, i.e., the 0° direction becomes (X–Y) times, and the driving of the tracking element toward the 45° direction relative to the x axis becomes Y times. The total traverse distance of a tracking element when it moves accurately in a zigzag path exactly according to the pulse distribution is as follows.

$$(X - Y) + \sqrt{2}Y \quad \text{(Eq. 22)}$$

This, in general, is as follows.

$$X + Y(\sqrt{2}-1) \geq \sqrt{X^2+Y^2} \quad \text{(Eq. 23)}$$

The left and right terms of this equation are equal when X=Y and Y=0. Then, by denoting the pulse interval when the direction is 0° by T and applying the time of $\sqrt{2}\,T$ when the direction is 45°, the required time up to the objective coordinates P (X,Y) is as follow from Eq. 22.

$$T(x - Y + \sqrt{2}Y) \quad \text{(Eq. 24)}$$

Accordingly, from Eqs. 22 and 24, the velocity becomes $$(X - Y + \sqrt{2}Y) / T\,.(X - Y + \sqrt{2}Y) = 1/T \quad \text{(Eq. 25)}$$

This result is independent of the coordinate values of P (X,Y).

One mode of pulse distribution in the x and y axes according to this invention is indicated in FIG. 34, in which reference numerals 3401 through 3406 designate pusles distributed to the x axis, while numerals 3411 and 3412 designate pulses distributed to the y axis. When pulses are distributed to both axes, the interval of distribution of the succeeding standard pulses ($x$-axis pulses) is $\sqrt{2}\,T$.

Figure 35:
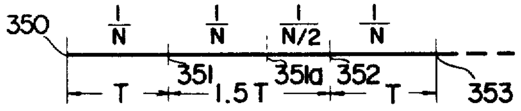
FIG. 35 is a graphical representation and FIGS. 36 and 37 are block diagrams indicating an example of practice of pulse distribution for obtaining this constant velocity.

According to the requirements of ordinary velocity control, it is permissible to resort to the approximation $\sqrt{2} \approx 1.5$, and a pulse distribution thus obtained is shown in FIG. 35. Pulses 350, 351, 352, 353, .... are standard pulses, while a pulse is not distributed at 351*a*. That is, at the time of distribution of the pulse 351, a pulse is distributed to both axes.

Figure 36:
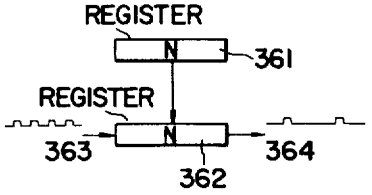
Figure 37:
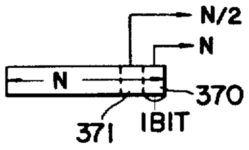

One example of means for generating pulses of period T is illustrated in FIGS. 36 and 37. In the operation of this means, the value N of a register 361 in which a numerical value N corresponding to period T (= 1/N) is preset is transferred to a register 362, and clock pulses 363 (from the left as viewed in FIG. 36) are introduced as input, whereupon output pulses 364 are obtained for each 1/N. The interval at which these output pulses 364 are generated is equal to the period T. Further, when it is desired to extract a frequency of 1/(N/2) of clock pulses, and the set value N for the register is sent out as output from a bit 370, the value N/2 is obtained by extracting an output from the bit 371 which is in a higher position by one bit.

Furthermore, it is also possible to obtain $\sqrt{2N}$ in the aforedescribed tracking of a parabola. Alternatively, it is readily possible also to determine $\sqrt{2N}$ by another means and preset the same. That is, a specific period is preset beforehand and extracted for use in accordance with necessity.

In an actual application of the numerical control according to this invention to the cutting of a workpiece by using a tool, the tool, e.g., a rotary cutter, is positioned at a position where it is offset by a distance equal to its radius from the finishing dimension of the workpiece. That is, techniques according to the invention for correcting for the tool radius with now be described with respect to specific examples of shapes of workpieces.

Figure 38:
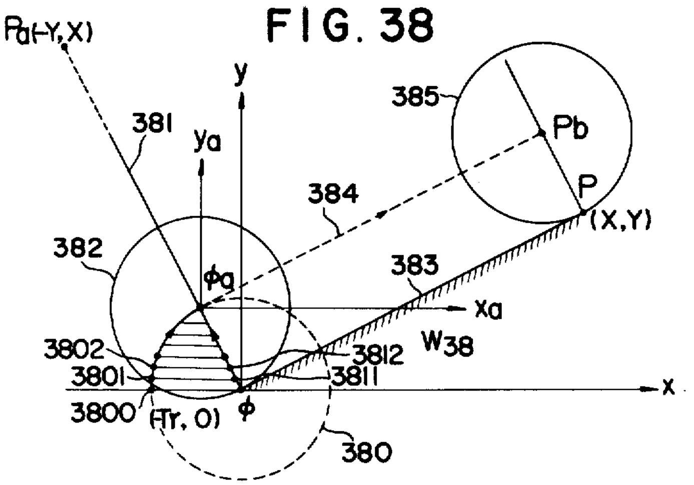
FIG. 38 is a diagram.

FIGS. 38 through 41 illustrate the cutter-radius correction in the case where a workpiece $W_{38}$ is cut along a straight line from a point $\phi$ to a point (X,Y). If a rotary cutter of a radius Tr with a center at the origin $\phi$ were to be brought, in this state, into the cutting operation as indicated in FIG. 38, a cutting surface as indicated by intermittent-line circle 380 would result, which would be undesirable.

Accordingly, the center of the cutter is moved from a point $\phi_a$ on a line 381 perpendicular to the straight line 383 to be cut (i.e., the line 381 joining the point $P_a$ (−Y,X) and the origin $\phi$) and at a distance equal to the cutter radius Tr from the origin $\phi$ along a line 384 parallel to the straight line 383 to be cut, whereupon a surface cut in conformance with the command is obtained.

The offsetting of the cutter center from point $\phi$ to point $\phi_a$ will be considered. It will be apparent that the point $\phi_a$ to be determined is the intersection of the arc tracked along the periphery of the circle 380 from a point 3800 (−Tr, O) toward point $\phi_a$ and the straight line 381 tracked from point $\phi$. Accordingly, the center of the cutter is offset from the point $\phi$ in accordance with an operation of this character. For this purpose, point $P_{la}$ (Y,X) in FIG. 39 is applied as the objective position of a straight line, and center coordinates (Tr,O) in FIG. 40 are applied relative to an arc. In FIGS. 39 and 40, the straight line 390 and the arc 400 correspond to line 381 and arc 380 in FIG. 38.

Figure 41:
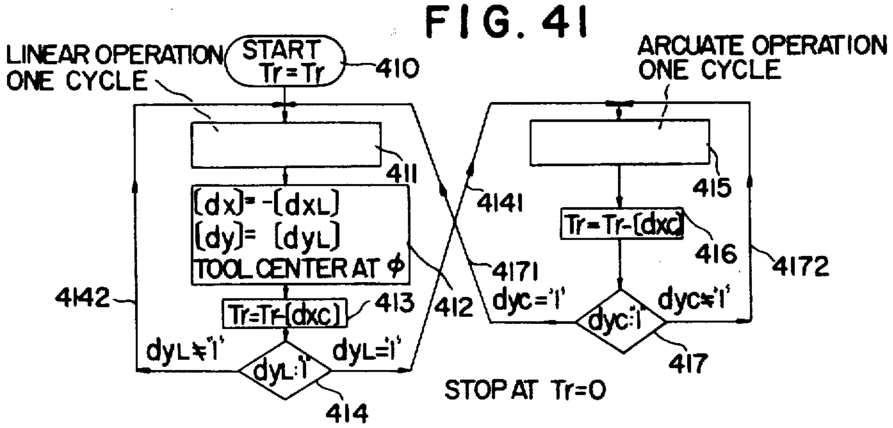
FIG. 41 is a block diagram for a description of the path of travel of a tool (a cutter) when it cuts a workpiece in a straight line through an application of this invention and the software therefor.

The flow chart of the operation for this offsetting of the cutter is shown in FIG. 41. The operation start at 410 with the cutter radius Tr = Tr, and at 411 the hardware shown in FIG. 7 is used to carry out processes in accordance with the flow chart shown in FIG. 8, the operation of loop 81 or loop 82 being carried out once. That is, one cycle of a linear operation is carried out. Then, in order to cause the coordinate axes of FIG. 39 to coincide with FIG. 38, the distance $[dx_L]$ through which the cutter is driven when there is one pulse in the direction of the horizontal axis $X_L$ in FIG. 39 is converted into a driving distance [dx] of one pulse in the $-x$ direction of the horizontal axis in FIG. 38. The same procedure is carried out also with the direction of the vertical axes.

The results thus obtained are processed in the operation of process 412, whereby the following conversions are carried out.

$$[dx] = -[dx_L] \quad \text{(Eq. 26)}$$

$$[dy] = +[dy_L] \quad \text{(eq. 27)}$$

It cannot be assumed, however, that there will always be driving in the direction of the y axis. The reason for this is that one cycle of linear operation is one cyclic period of the repetitions of the operation of the loop 81 or loop 82 until discrimination of the code of the result Δ, and the presence or absence of pulse distribution in the *y*-axis direction is determined by the selection between the two loops.

By the conversions indicated by Eqs. 26 and 27, the cutter center is first brought to point 3811.

Then, in process 413, the following operation is carried out.

$$Tr = Tr - [dx_L] \quad \text{(Eq. 28)}$$

In process 414, the pulse $dy_L$ is subjected to discrimination as to whether or not it is 1. Until the pulse $dy_L$ becomes 1, the operation of loop 4142 is repeatedly carried out, and when the pulse $dy_L$ becomes 1, one cycle of arcuate operation of process 415 is carried out through loop 4141.

This one cycle of arcuate operation is also defined, similarly as the aforementioned one cycle of linear operation, as one cyclic period of the repetitions of the operation of loop 81 or loop 82 by discrimination of the code of the result Δ. This represents tracking of the arc 400 from the origin O in FIG. 40, and the operation of loop 4172 is repeatedly carried out until the pulse to the $y_c$ axis becomes 1, that is, until the pulse is distributed. Then, in process 416, the following operation is carried out.

$$Tr = Tr - [dx_c], \quad \text{(Eq. 29)}$$

where $[dx_c]$ is the driving distance due to pulse distribution in the $x_c$ − axis direction.

If the pulse for the $y_c$ axis is applied, the decision at 417 will become $dy_c = 1$. Accordingly, the pulse is again introduced into process 411, and linear operation is carried out. When $dy_c = 1$, the tracking element of arc 380 reaches point 3801. Since the *y*-axis component $[dy_L]$ of point 3811 and the y-axis component $[dy_c]$ of point 3801 each correspond to one pulse, the following relationship is valid.

$$[dy_L] = [dy_c] \quad \text{(Eq. 30)}$$

In this manner, the operations of from origin $\phi$ to point 3812, of from point 3800 (−Tr, 0) to point 3801, then from point 3811 to point 3802, (and so forth), are carried out in accordance with the flow chart shown in FIG. 41. When the result of the operations of processes 413 and 416 become Tr = 0, that is, when the cutter center reaches point $\phi_a$, this operation is completed, which means that the correction of the cutter radius Tr in linear interpolation has been carried out.

Figure 42:
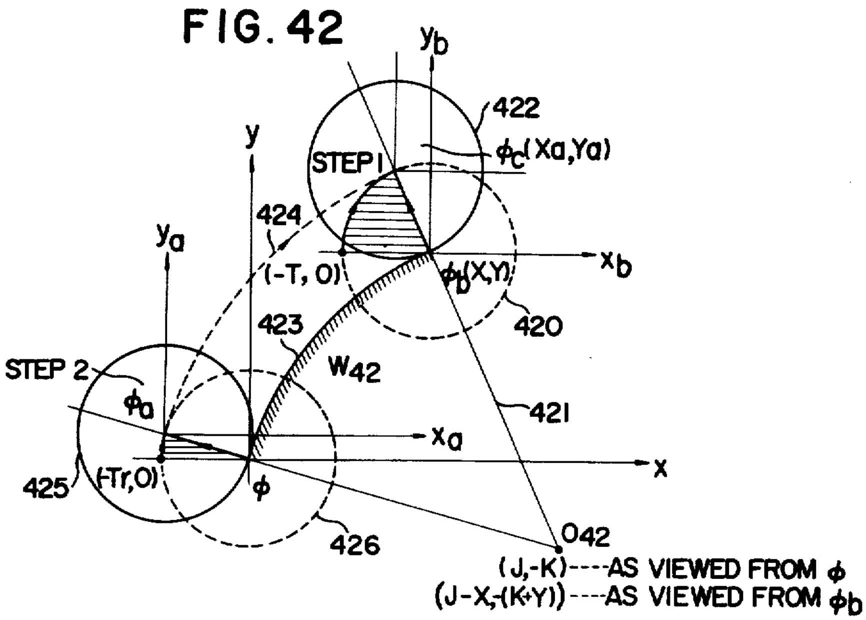
FIG. 42 is a diagram.

Next, the correction for the cutter radius in arcuate interpolation will be described. It will be assumed, for example, that interpolation is carried out with respect to an objective (X,Y) with a center (J, −K) with clockwise rotation from the outside as indicated in FIG. 42. More specifically, the case wherein interpolation is carried out with a rotary cutter of radius Tr along an arc 423 with respect to a workpiece $W_{42}$ will be considered.

First, as the first stage (Step 1), the coordinate values (X,Y) of the objective $\phi_b$ is corrected to point $\phi_c$ of coordinates (Xa, Ya) on a straight line 421 joining the center $O_{42}$ of an arc 423 and point $\phi_b$ and at a distance Tr from point $\phi_b$.

Figure 45:
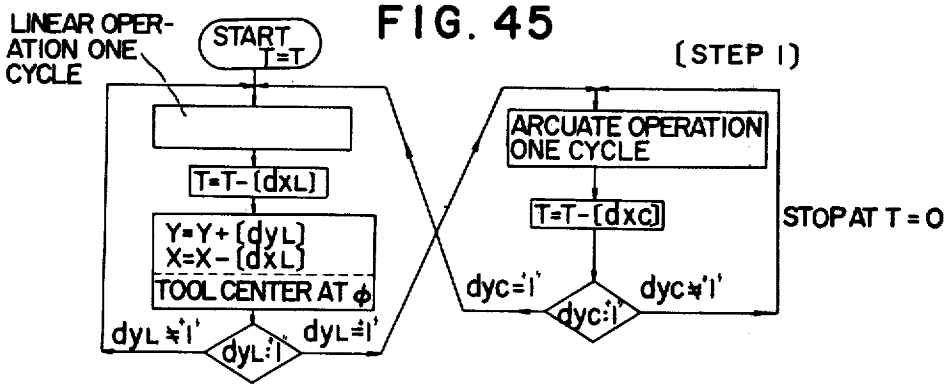
FIGS. 45 and 48 are block diagrams for a description of the path of travel of a tool (a cutter) when it cuts a workpiece along an arc through an application of this invention and the softward therefor.

This operation is indicated in FIGS. 43, 44, and 45. In this case, the coordinate values of the center $O_{42}$ is converted into the values (J−X, −(K+Y) ) as viewed from point $\phi_b$, and the operation is carried out after the objective position of a straight line has been determined.

The values of X and Y at Tr = 0 become the coordinate values of point $\phi_c$ as viewed from point $\phi$ and are denoted by X $\Phi$ and Y$\Phi$ .

As the succeeding second stage (Step 2), correction of the present position of the cutter, the corresponding correction of the center $0_{42}$ coordinates (J, − K), and recorrection of the objective $\phi_c$ of coodinates (X $\Phi$ , Y $\Phi$ ) corrected in Step 1 are carried out. The reason for this is that, since the cutter center position moves from point $\phi$ to point $\phi$a , and interpolation of the arc 424 starts therefrom, it is necessary to transpose the coordinate system to one which has an origin $\phi$a and axes $x_a$ and $y_a$ as horizontal and vertical axes, respectively.

Figure 46:
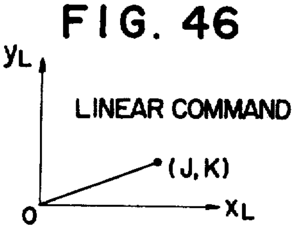
Figure 47:
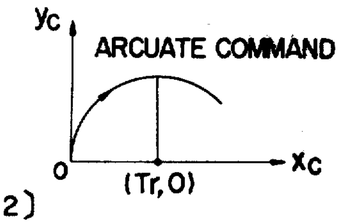
Figure 48:
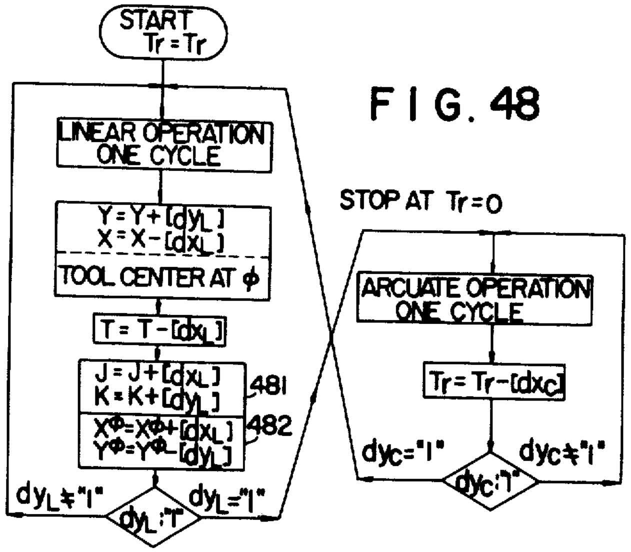

Thus operation is indicated in FIGS. 46, 47, and 48. Here, the center of the center is shifted to point $\phi$, and, at the same time, the coordinates of cutter $0_{42}$ as viewed from point $\phi$a are determined at block 481. Furthermore, the coodinate values X and y as viewed from point $\phi$ are similarly obtained as objective values Xa and Ya as viewed from point $\phi$a. Accordingly, these are used in carrying out arcuate interpolation as described with reference to FIGS. 9, 10, and 11, whereupon arcuate interpolation with correction for cutter radius is carried out.

Figure 49:
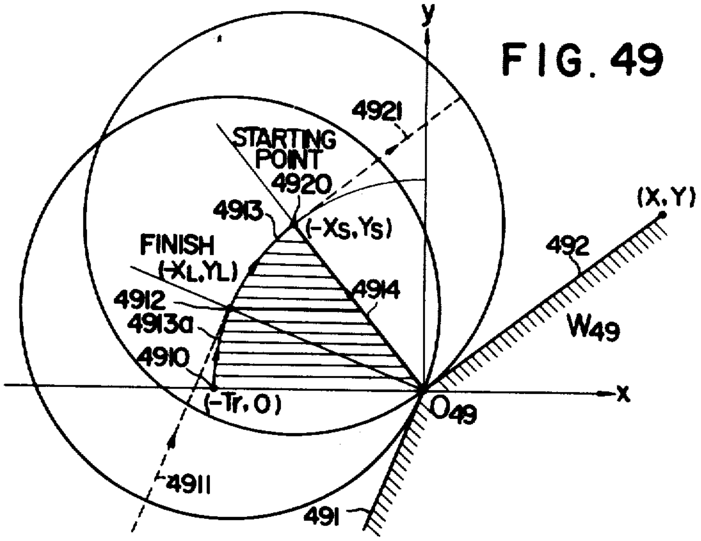
FIG. 49 is a diagram.

Next, the handling of a tool (rotary cutter) at a point of changeover of function will be described. FIG. 49 indicates a case wherein the surface of a workpiece $W_{49}$ changes abruptly from a straight line represented by a certain function 491 to a straight line represented by another function 492 at an inflection point $0_{49}$. The cutting operation of a rotary cutter of a radius Tr in this case will be considered.

The path of the cutter center in this case passes from a straight line 4911, through the terminal point 4912 ($-X_L$, $Y_L$) of the function thereof, along an arc 4913, through the initial point 4920 ($-X_s$,$Y_s$) of the succeeding function, and to a straight line 4921.

It is apparent from an examination of the relationship between the starting and initial points 4910 and 4920 of the arcuate operation and the inflection point $O_{49}$, that it can be solved by points 3800, $\phi_a$, and $\phi$ of FIG. 38. The arc is so selected that it starts from the x axis or y axis (the x axis in this case), passes through the terminal point 4912 of the preceding function, and then reaches the initial point 4920 of the succeeding function. Then, only the result of the operation from the terminal point 4912 to the initial point 4920 is applied to the machine for moving the cutter center, and the result of the remainder operation is not applied to the machine (corresponding to the operation from point 4910 to point 4912).

Figure 50:
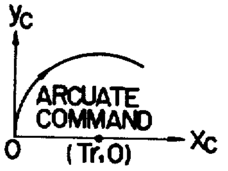
FIGS. 50 and 51 are graphical representations.
Figure 51:
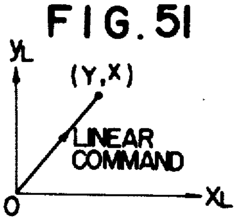
Figure 52:
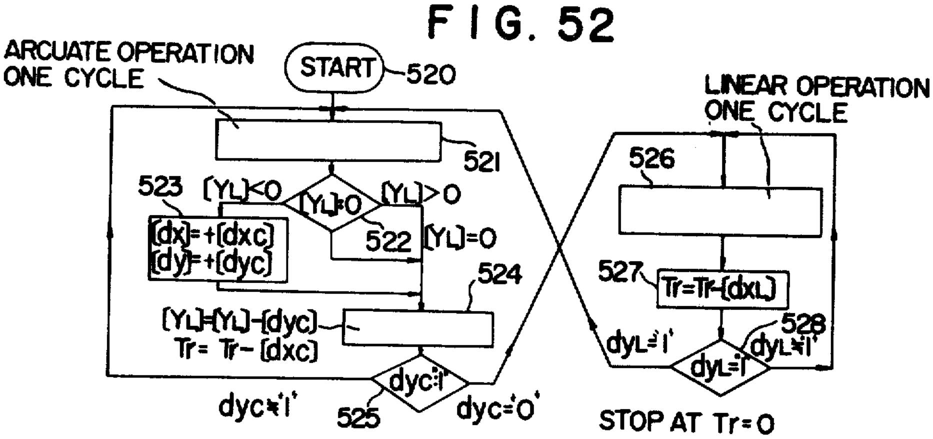
FIG. 52 is a block diagram for a description of the path of travel of a tool (a cutter) when it cuts a workpiece having a point of inflection through an application of this invention and the software therefor.

The commands applied to the hardware for generating the arc and the straight lines are as indicated in FIGS. 50 and 51, and all of the operations described above and shown in FIG. 49 are represented by the flow chart shown in FIG. 52. In FIG. 52, the cutter center, at a previously memorized terminal point 4912, stops tracking the line 4911 which has corrected the function 491 up to this point.

With a starting command 520, one cycle of the above mentioned arcuate operation is carried out in process 521. The nature of the sign (positive, negative, or zero) which the result, the *y*-coordinate value ($y_L$) of the terminal point 4912, has is determined at decision 522. As long as the arcuate operation is being carried out in the region below the thick horizontal line drawn from this terminal point 4912, the sign thereof is positive, and no operation is carried out in process 313. That is, the operations of arc 4913$_a$ and straight line 4914 are carried out by processes other than the loop terminating the process 313, namely, processes 526 and 527 and decisions 525 and 528, but the moving of the cutter center by the machine is not carried out.

When the arcuate operation completes the part of arc 4913$_a$ in this manner and arrives at terminal point 4912, the condition [$y_L$] <0 becomes valid thereafter. Consequently, the operation of process 523 begins, whereby the machine is driven, and the center of the cutter moves along the arc 4913. When the initial point 4920 is reached, $T_r$ = 0 as a result of processes 524 and 527, and operation for tool (cutter) handling at function-changeover point $0_{49}$ is completed.

Spirals and group circles are generated by the method of this invention in the following manner.

Heretofore, in the case where holes of numerous kinds are to be formed by a single machine tool, it has been the common practice to prepare a large number of cutters corresponding respectively to the holes, selecting the appropriate cutter for each hole forming operation, and mounting this cutter of the main shaft head of the machine. In a universal machine tool wherein many machining functions are incorporated and automatized, as in a so-called machining center, the machanism (automatic tool changer) for automatically selecting and exchanging cutters of this type, particularly, tend to become complicated and are apt to introduce errors accompanying tool changes.

Figure 53:
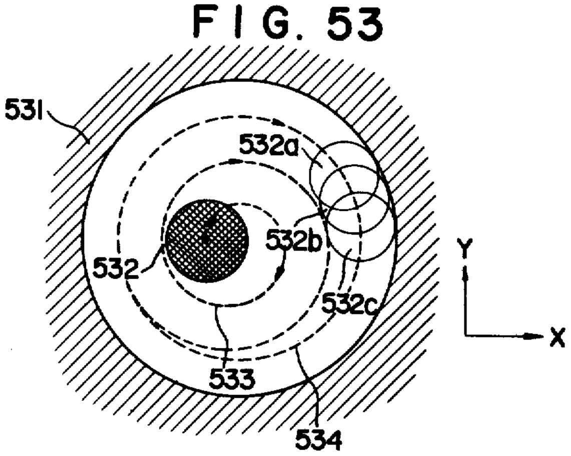
FIG. 53 is a diagram indicating the cutting of a hole of a desired diameter with a single tool (a cutter) which undergoes a spiral motion transitting into a circular motion.

In the practice of this invention, this difficulty is overcome. This feature will now be described with respect to the work of opening a hole in a workpiece as illustrated in FIG. 53. The process of cutting the workpiece 531 with a rotary cutter 532 comprises controlling the relative positions of the cutter and the workpiece in a manner to cause the path of the cutter 532 relative to the workpiece 531 to assume the form of a spiral curve 533 which expands toward the outside and, when the hole becomes one of the specified dimension, changing over the spiral curve 533 to a circle 534 thereby to complete the hole machining or boring. Thus, it is possible to form holes of any diameter by means of a single cutter 532.

Figure 54:
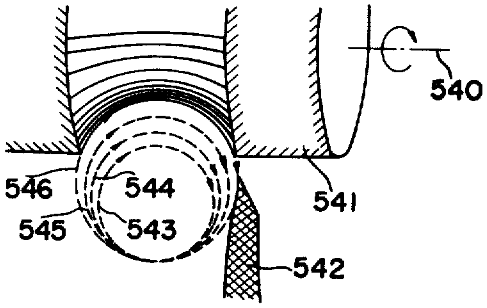
FIG. 54 is a diagram, partly in perspective, indicating the cutting a workpiece by means of a cutting tool undergoing a motion of group circles.

In another application of this invention in a machine tool as illustrated in FIG. 54, the workpiece 541 is a circular cylinder in which an arcuate cut is to be made with a cutting tool 542. Since there is a limit to the amount of cut which can be made by the cutting tool during one cutting stroke, it is impossible to complete the work with one cutting stroke.

Accordingly, it has been necessary in known numerical-control apparatuses to divide the movement of the cutting tool 542 from work start to completion into a large number of steps in each case, program all of these steps, and use them as input into the input device of the numerical-control apparatus. Of course, there are numerical-control apparatuses in which such steps can be automatically processed therewithin, but these apparatuses require the addition of special information-processing apparatuses such as electronic computers.

In accordance with this invention, the cylindrical workpiece 541 is rotated about its axis 540, and, since the cutting tool 542 can be caused to undergo a movement which readily generates group circles 543 through 546, this is utilized to accomplish the cutting work from start to completion in one step.

Figure 11:
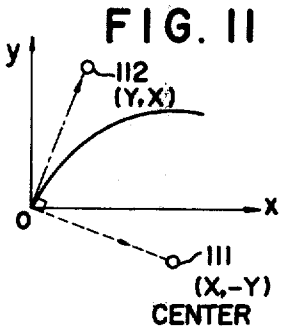

Referring back to the tracking of an arc described with reference to FIGS. 9, 10, and 11, the term of the x-axis series in this tracking progressively decreases with a tolerance of $-1$ unitl it ultimately becomes zero. At this time, the $x$-axis and $y$-axis series have each advanced to the R th term, where R denotes the radius of the arc ($X = R$ in FIG. 9), and the coordinates of the arc at this time are (R,R). Thereafter, the sign of the tolerance is inverted, and at the same time, the sign in the $y$-axis direction is inverted, whereupon the arc continues. Thereafter, by carrying out the same sign processing each time the term of one of the series becomes zero, a 360° arc is obtained without accumulated error. The tolerances and advance directions in a 360°, clockwise arc of this character are shown in FIG. 55.

A spiral curve is generated by using the arc-generating method described above and applying a correction for the radius for each 90°. That is, each time the term of one of the series becomes zero, the variation increment R of the radius for the spiral is added to the other, the method being the same in all other respects to that for generating an arc.

The principle of the generation of this spiral curve is indicated in FIGS. 56 and 57. The point 571 at which the $x$-axis term becomes zero corresponds to a point 5621 on an arcuate curve. By adding $\Delta$ R to the $x$-axis term at this time, the arc center is equivalently shifted from a point 561 to a point 563, and the radius is increased by $\Delta$ R. By similarly repeating this process thereafter each time the term of one of the terms becomes zero, it is possible to generate a spiral curve expanding outward. When the rotational angle of the spiral becomes 360°, the center returns to the first point 561, and the radius has increased from its first value by 4.ΔR.

Figure 58:
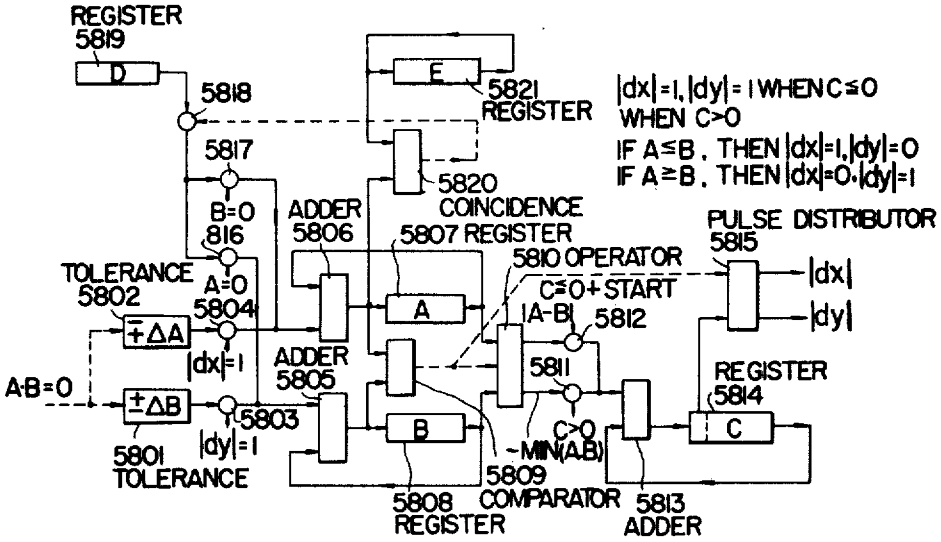

An example of practice embodying the principle of the above described operation will now be described in detail with respect to the operation of the circuit as illustrated by the electrical block diagram in FIG. 58 and the flow chart thereof in FIG. 59.

The circuit is provided with registers 5807 and 5808 for memorizing the terms of the $x$-axis and $y$-axis series, register 5819 for memorizing the increase in the radius, and register 5821 for memorizing the final radius. The registers 5807 and 5808 correspond to registers 101 and 102 in FIG. 12. The radius R at the time of work start is preset in the register 5807 as the first term of the $x$-axis series.

A coincidence circuit 5820 is provided to detect whether or not the radius during machining work is equal to the final radius and accordingly controls the changeover carried out finally from the spiral curve (at which time gate 5818 is ON) to a circle (at which time gate 5818 becomes OFF). Gates 5816 and 5817 respectively become ON when the terms of the series of the $x$ and $y$ axes are zero, and radius correction is carried out through adders 5805 and 5806.

Control is so effected that when either of the terms is zero, the signs of the outputs of tolerance generators 5802 and 5801 for generating tolerances $\pm \Delta$ A and $\pm \Delta$ B, which are increase increments with respect to the contents A and B of the registers 5807 and 5808, are both reversed, but only one of the directions of advance of ($A.B = 0$), $x$, $y$ is reversed, whereby the sign chart set forth in FIG. 55 is realized. Circuits 5816 and 5817 are provided to determine the signs (advance directions) of $x$ and $y$.

The function of the group comprising circuits indicated by blocks 5809 through 5815 is to effect decisions successively with respect to the terms A and B of the series supplied by the registers 5807 and 5808 thereby to control the pulse distributions $|dx|$ and $|dy|$ to both axes $x$ and $y$ and, at the same time, to transmit series advance commands to gates 5803 and 5804. Here, the axis of smaller series term, in other words, the axis of higher pulse distribution density, is selected as a standard, and when pulse are applied to this axis, decision is made as to whether or not to apply pulses to the other axis.

A comparator 5809 continually compares the relative magnitudes of terms A and B and determines the axis to be the standard in the following manner.

| | |
|---|---|
| When $A < B$, | x axis |
| When $A > B$, | y axis |

The standard axis is reversed four times for every 360°. An operator 5810 receives as input the values of A and B of the registers 5807 and 5808 and the result of comparison of the comparator 5809 and transmits as output the absolute value $|A-B|$ of the difference of values A and B to the gate 5812 and the value $-$Min (A, B) of the smaller of the terms A and B to the gate 5811.

The operation of the group of circuits 5809 through 5819 will now be described with reference to the flow chart shown in FIG. 59.

It will be assumed that the radius R at the time of start of the machining work is preset in the register 5807, and the tolerance generators 5801,5802 are respectively producing outputs +1 and $-1$. Then the initial values of the contents, denoted by A, B, and C, of the registers 5807, 5808, and 5814 are $A = R$, $B = 0$, and $C = 0$ (register 5814 corresponding to register 107 in FIG. 12), and the comparator 5809 is producing $A>B$ as output.

A START command first causes the gate 5812 to assume the ON state, and, through the adder 5813, the operation indicated by process 5901 in FIG. 59 is carried out, the result being introduced newly into the register 5814. Consequently, the content of this register 5814 becomes $C = R$. The circuit 5815 for sign detection and pulse distribution detects the sign of the content C of the register 5814 and controls the pulses $dx$ and $dy$ distributed to the $x$ and $y$ axes, at the same time controlling the tolerance adding gates 5803 and 5804 thereby to cause the series to advance. While the sign of the operational result $C = R$ in this case is similarly detected, the pulse distribution circuit 5815 does not carry out pulse distribution and carries out only control of the gates 5803 and 5804 only in the first operation due to the START command, thereafter remaining idle until an operation command arrives.

When the operation is in this state, $A = R$, $B = 1$, and $C = R$. Indication of the operational command is omitted in FIG. 58.

When the operational command arrives with the operation in this state, since C > 0, the gate 5811 assumes its ON state, and the operation of process 5906 in FIG. 59 is carried out through the adder 5813, whereby C = R − 1. The sign of content C is again detected by pulse distribution circuit 5815, and if C>0, one pulse is applied to only the Y axis, and the gate 5803 is turned ON to cause the *y*axis series to advance. That is, processes 5907 and 5908 of FIG. 59 are carried out.

Each time an operational command arrives thereafter, the operation of process 5906 or 5901 of FIG. 59 is carried out in accordance with the result of the preceding operational cycle, and the sign of the content C of the register 5814 is newly detected, whereby the distribution of pulses to the *x* and *y* axes and the advance of the series are controlled. Through the repetition of the above described process, a curve is generated. When, during this process, the relative magnitudes of the contents A and B of the registers 5807 and 5808 are reversed, and A becomes less than B, the operation of processes 5901 through 5909 in FIG. 59 is automatically changed to that of processes 5911 through 5919.

The speed of curve generation corresponds directly to the frequency of repetition of the operational command.

The radius at the start of machining is then set in the register 5807, the final radius is set in the register 5821, and the ¼ of the quantity of cut is set in the register 5819. Then, by applying operational commands with the required repetitive time to this function generating circuit, the path indicated by intermittent line in FIG. 53 is obtained by a movement the velocity of which is continuously controlled, and, ultimately, the movement is changed over from a spiral to a circular movement.

The function generating circuit in this example is capable of continuously generating various curves in addition to the above described spiral curves which expand outward. For example, by setting a negative radius increment (− Δ R) in the register 5819 of FIG. 58, a spiral curve wherein the radius progressively decreases as indicated in FIG. 60 is obtained.

Figure 61:
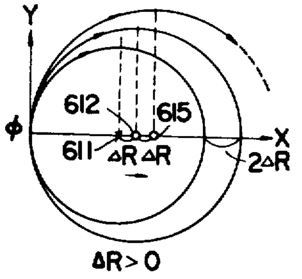
Figure 62:
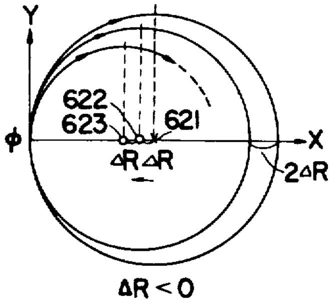

Furthermore, by controlling the gates 5816 and 5817 the radius correction every 90 degrees described hereinbefore can be readily changed to a correction every 360°, whereby group circles as shown in FIGS. 61 and 62 are continuously generated. The case wherein a positive value (ΔR>0) is set in the register 5819 is illustrated in FIG. 61, while the case wherein a negative value (ΔR>0) is thus set is illustrated in FIG. 62. The centers of these group circles are indicated as shifting by Δ R to assume positions 611, 612, 613, ..... and 621, 622, 623, ..... By the generation of these group circles, the arcuate cutting (543 through 546) with respect to a cylindrical workpiece as shown in FIG. 54 can be carried out in a simple manner.

Figure 63:
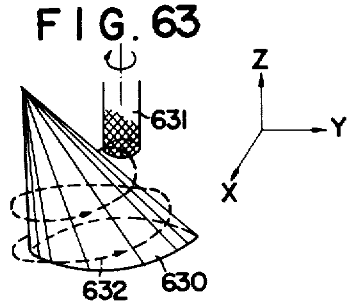
FIGS. 61 and 62 are graphical representations and FIG. 63 is a diagram indicating a pulse distribution method for generation of group circle functions according to the invention and the application thereof to cutting a workpiece of conical shape.

In addition, the application of this invention to the machining of conical structures by means of shapers and milling machines is also possible. FIG. 63 indicates the manner in which an inclined conical structure 630 is machined. In this case, a function generating circuit continuously generates the curve of FIG. 62 and controls movement in the *x,y* plane. At the same time, the cutter 631 is fed in the *z*-axis direction in synchronism with the angular velocity of the movement in the *x, y* plane and tracks a threedimensional curve 632.

By a similar method, machining such as forming a tapped hole with a taper can be accomplished. The series of curves such as straight lines, arcs, ellipses, parabolas, hyperbolas, spirals, and group circles which were described through the use of arithmetic progressions may here by collectively called curves of "rotation type." Another series of different curves described hereinafter may be collectively called curves of "translation type." Among these curves are included straight lines, exponential curves, logarithmic curves, and fractional curves. That is, a curve of "rotation type" is one the advance direction of which at each instant is perpendicular relative to point P, while a curve of "translation type" is one the advance direction of which at each instant is toward the point P.

Accordingly, in the case where point P is a fixed point, the curve, if of the "rotation type," is an arc with its center at point P and, if of the "translation type," is a line segment extending to point P. In the hardware of this "translation type," the point P is adapted to undergo linear movement, as described hereinafter.

The foregoing description of the operations of hardwares has been limited to those for curves of the "rotation type." While the point P has been treated as a center, it may be fixed or may undergo linear movement. In the latter case, the movement of the point P is in synchronism with the advance of the generated curve, that is, the distribution of pulses to both axes, whereby the coordinate values (X,Y) of the point at any given time varies according to an arithmetic progression.

Conversely stated, when the tolerances applied to register 101 (or 5807) constituting register A and to register 102 (or 5808) constituting register B are denoted by Δ a and Δ B, the advance direction of the point P is determined by designating these tolerances Δ A and Δ B.

If, in an orthogonal coordinate system, the mutual relationship of the *x* and *y* axes is reversed, vectors are rotated by 90° of angle. Accordingly, "rotation type" and "translation type" curves can both be processed conveniently by merely interchanging the output pulses *dx* and *dy* and processing the signs without resorting to different kinds of hardware.

Figure 66:
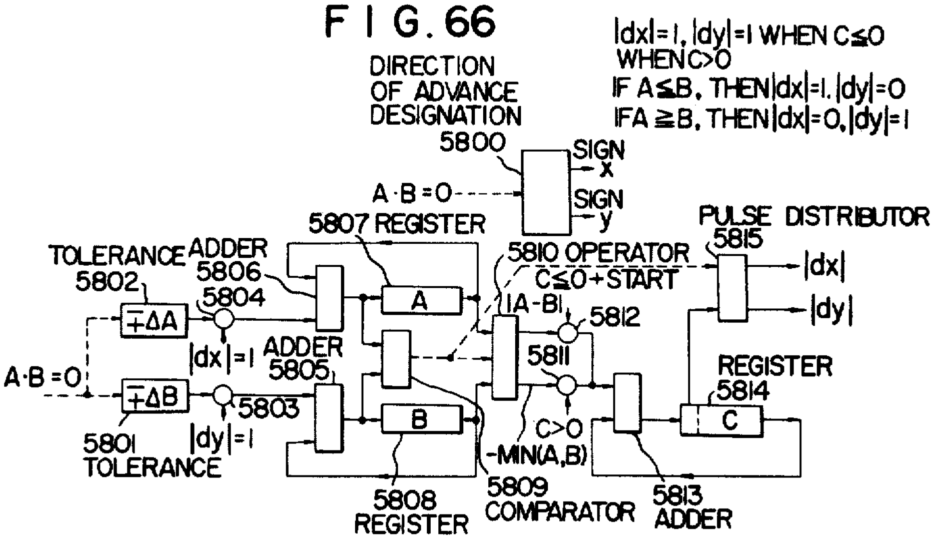
FIGS. 66 and 67 are block diagrams indicating the hardware and software for tracking a curve of the above mentioned "translation type"

An example of hardware for a "translation type" may be considered with reference to FIG. 66, in which the circuit blocks are respectively the same as those of the previously described hardware for a "rotation type." Block 5800 produces as output at least one signal of sign *x* and sign *y* which determine the advance direction when at least one register of registers 5807 and 5809 becomes zero.

The flow chart of the operation of a "translation type" is as set forth in FIG. 67 and differs somewhat from those described hereinabove. That is, the quantities *dx* and *dy* in processes 903 and 913 assume a reverse relationship, and the operations in processes 904 and 914 are mutually interchanged.

Figure 68:
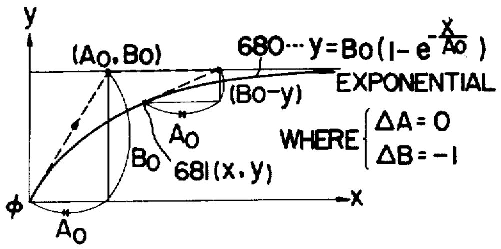
FIG. 68 is a graphical representation indicating a mathematical analysis of an exponential curve resulting from the above mentioned technique of "translation type"
Figure 67:
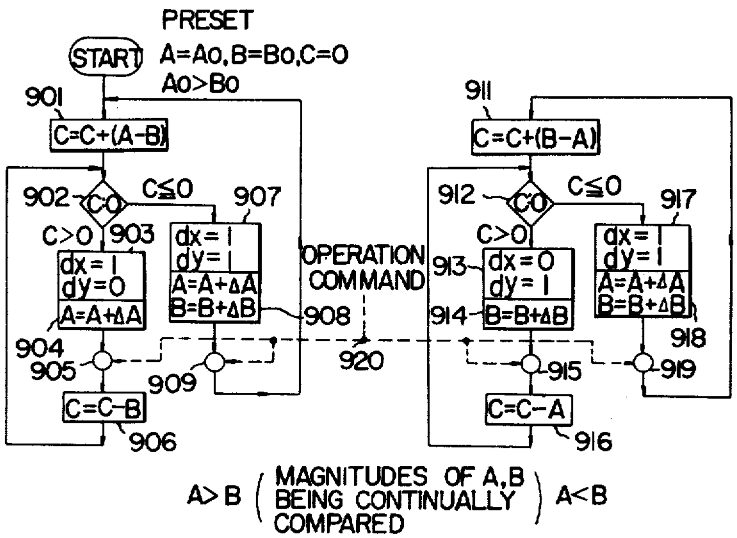
Figures 64, 65:
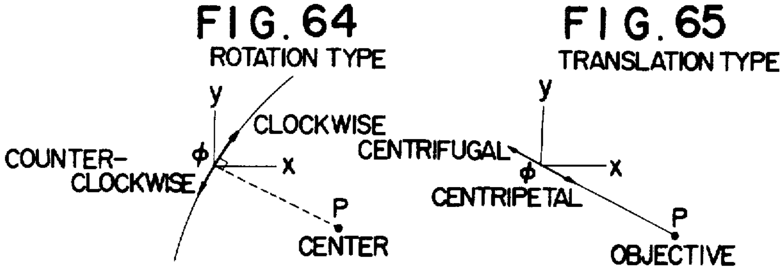
FIG. 64 is a diagram for a description of a curve of "rotation type" as herein referred to for tracking a curve as it rotates about a point P.
FIG. 65 is a diagram for a description of a curve of "translation type" as herein referred to for tracking a curve as it advances in a straight line with respect to an objective P.

An exponential curve obtained by applying the software shown in FIG. 67 to the hardware shown in FIG. 66 is shown as curve 680 in FIG. 68.

A mathematical proof of this curve is as follows. In this case, the initial values are set in the following manner.

$A = A_o$ (corresponding to the time constant); $B = B_o$ (final value);

$\Delta A = O$, $\Delta B = -1$ (exponential designation)

In the operation, since $B = B - 1$ every time there is a pulse *dy* to the *y* axis, the following equation is valid at any point 681 (*x,y*) on the curve 680.

$$dy/dx = (B_o - y)/A_o \quad \text{(Eq. 31)}$$

Accordingly, $dy/(B_o - y) = dx/A_o$ $$\therefore -\log(B_o - y) = \frac{x}{A_o} + K \qquad (\because K = \text{constant})$$

Then, since the curve 680 passes through the origin $\phi$ (0,0), $$\log\left\{B_o/(B_o - y)\right\} = x/A_o$$

$$\therefore y = B_o\left(1 - e^{-\frac{x}{A_o}}\right) \qquad \text{(Eq. 32)}$$

Eq. 32 is a linear delay, that is, a representative equation of an exponential curve.

A "translation type" curve can be represented by the following general equation.

$$dy/dx = (B_o + \Delta B.y)/(A_o + \Delta\text{to } A.x) \qquad \text{, (Eq. 33)}$$

Figure 69:
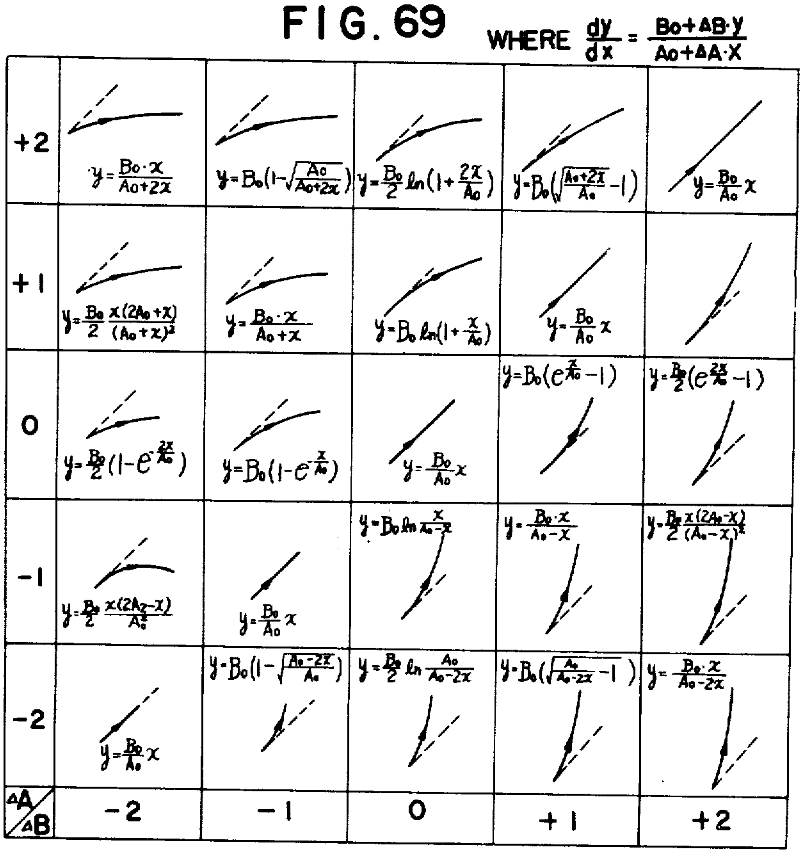
FIG. 69 is a table indicating variations in generated functions accompanying variations in the tolerances $\Delta A$ and $\Delta B$ of the $x$ and $y$ axes in the above mentioned translation-type technique.
Figure 70:
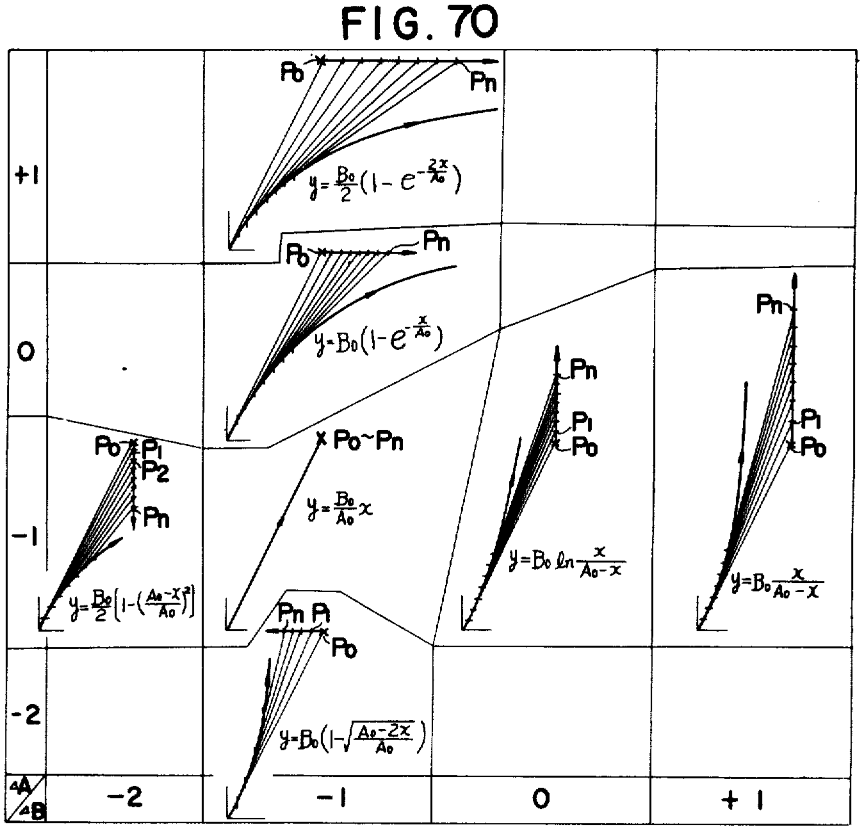
FIG. 70 is a table indicating in relatively greater detail the moving fixes (from Po through Pn) and the antipodal points of the generated curves of FIG. 69.

The relationships between various combinations of Δ A and Δ B and generated curves are indicated in FIG. 69, while movements (from $P_o$, $P_1$, $P_2$, ......., $P_n$) of centers are indicated in FIG. 70.

In the case of a "translation type," the advance of a term of the series indicating the *x* coordinate of a moving objective ($P_o$ through $P_n$) corrects the *y* coordinate, while the advance of a term of the series indicating the y coordinate corrects the *x* coordinate.

Figure 71:
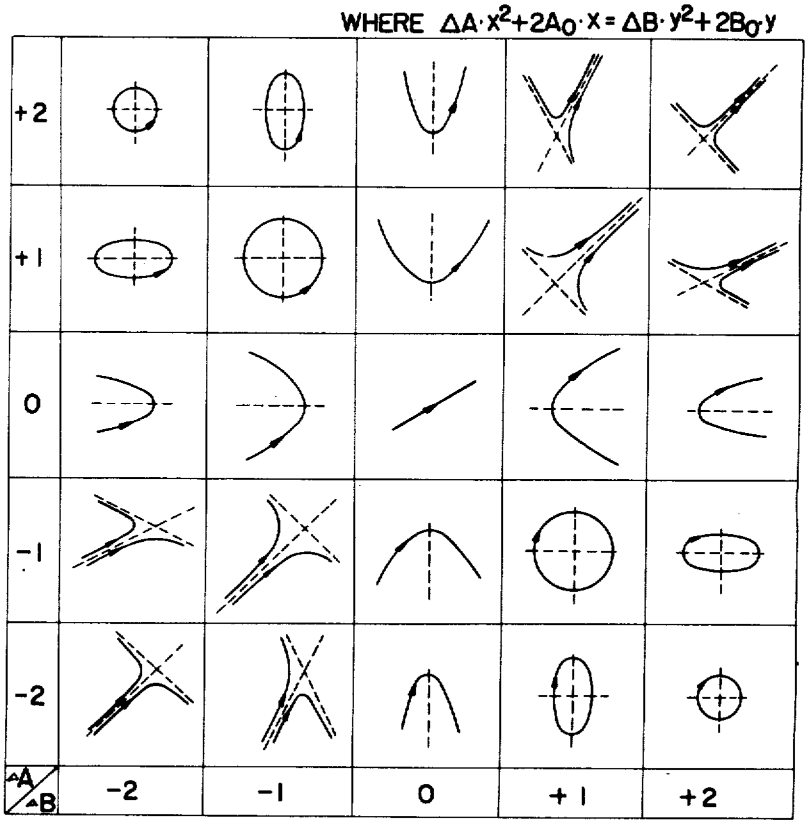
FIG. 71 is a table showing variations in the generated functions accompanying variations is the tolerances $\Delta A$ and $\Delta B$ of the $x$ and $y$ axes in the above mentioned "rotation type" technique.
Figure 72:
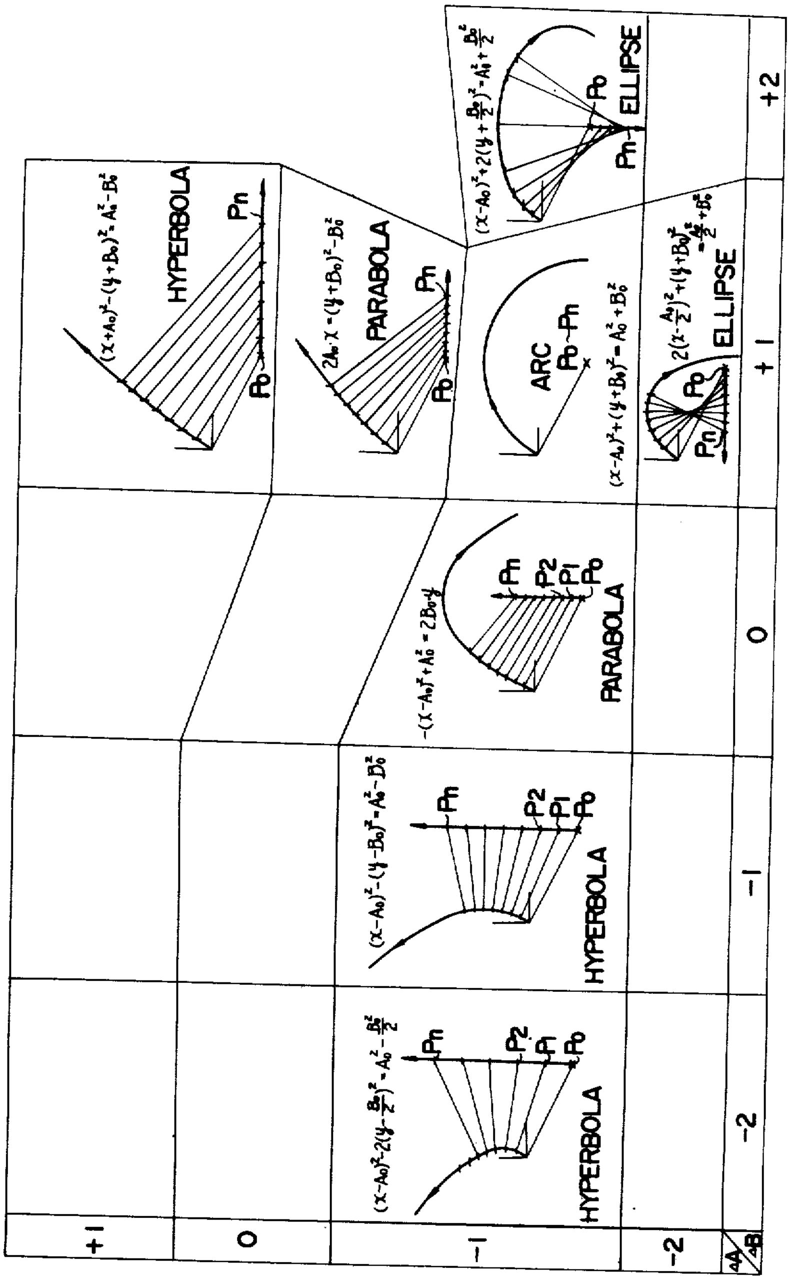
FIG. 72 is a table indicating in relatively greater detail the moving fixes (from Po through Pn) and antipodal points of the generated curve of FIG. 71.

Relationship corresponding to FIGS. 69 and 70 for the case of "rotation type" curves are shown in FIGS. 71 and 72 (wherein arrows indicate progress of terms).

Figure 73:
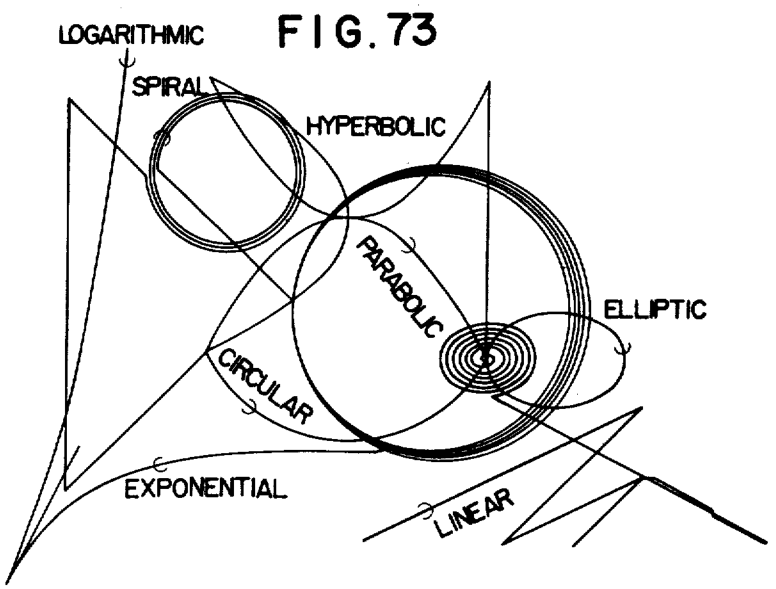
FIG. 73 is a drawing of reduced scale showing curves drawn as a result of actual function generation by means of a system according to this invention.

Figures actually drawn by means of a first prototype generator in accordance with this invention are shown on a reduced scale in FIG. 73. The principal particulars of this prototype function generator are: a minimum compound unit of 0.01 mm.; a maximum command valve of ±167,772.13 mm.; velocity range of from manual one-pulse transmission to 12,000 mm./min.; and hardware of one word = 25 bit of pure binary series operation type of 1-MHz clock frequency.

We claim:

1. A function generating system comprising, relative to an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result } \Delta'\text{)}+X-Y & \text{(for preceding operational result } \Delta' \leq O\text{) and;} \\ \text{(preceding operational result } \Delta'\text{)}-Y & \text{(for preceding operational result } \Delta' > O\text{),} \end{cases}$$

where pulse distribution is periodically carried out for the X axis, so that when said present value at Δ ≤ 0, one pulse distribution is effected for the Y axis, said system further comprising means for adding one quantized unit to the second register each time a pulse is generated in the axis direction related to said numerical value Y.

2. A function generating system comprising, relative to an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value if positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result} \Delta'\text{)}+X-Y & \text{(for preceding operational result} \Delta' \leq O\text{) and:} \\ \text{(preceding operational result} \Delta'\text{)}-Y & \text{(for preceding operational result} \Delta' > O\text{,} \end{cases}$$

where pulse distribution is periodically carried out for the X axis, so that when said present value of Δ ≤ 0, one pulse distribution is effected for Y axis, said system further comprising means coupled to said adder circuit for controlling the pulse distribution in the X axis to extend the period between the pulses thereof by a factor of approximately 1.5 when pulse distribution in the Y axis is omitted.

3. A system for controlling the machining of a workpiece by correcting the position of a rotary cutter comprising first circuit means including a first function generating system for generating a linear function, and second circuit means including a second function generating system for generating an arcuate function corresponding to the cutter radius, and means for operating said first and second circuit means so that said linear and arcuate functions are alternately generated each by a unit quantity, and the initial points and terminal points of the said functions are determined by using the distribution results of both functions, said first and said second function generating systems each comprising, relative to an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result } \Delta')+X-Y & \text{(for preceding operational result } \Delta' \leq O\text{) and;} \\ \text{(preceding operational result } \Delta')-Y & \text{(for preceding operational result } \Delta'>O\text{),} \end{cases}$$

where pulse distribution is periodically carried out for the X axis, so that when said present value at Δ ≤ 0, one pulse distribution is effected for the Y axis.

4. A function generating system for generating a function of spiral shape having an expanding variable radius, or initial value R relative to the coordinates of the center of a circle taken as an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result } \Delta')+X-Y & \text{(for preceding operational result } \Delta' \leq O\text{) and:} \\ \text{(preceding operational result } \Delta')-Y & \text{(for preceding operational result } \Delta'>O\text{),} \end{cases}$$

where pulse distribution is periodically carried out for the X axis, so that when said present value at Δ ≤ 0, one pulse distribution is effected for the Y axis, and means for subtracting one quantized unit from the first register each time a pulse is generated in the axis direction relating to said numerical value X, and for adding one quantized unit to the second register each time a pulse is generated in the axis direction related to said numerical value Y, and means for adding a predetermined value Δ R to one of the first and second registers each time the other register becomes zero.

5. A function generating system according to claim 4, and further comprising means for coupling said system to a cutter tool to control the machining of a hole of a desired diameter in a workpiece by means of the cutter tool disposed within said hole.

6. A function generating system for generating a function of spiral shape having a contracting variable radius, of initial value R relative to the coordinates of the center of a circle taken as an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result } \Delta')+X-Y & \text{(for preceding operational result } \Delta' \leq O\text{) and:} \\ \text{(preceding operational result } \Delta')-Y & \text{(for preceding operational result } \Delta'>O\text{),} \end{cases}$$

where pulse distribution is periodically carried out for the X axis, so that when said present value at Δ ≤ 0), one pulse distribution is effected for the Y axis, and means for subtracting one quantized unit from the first register each time a pulse is generated in the axis direction relating to said numerical value X, and for adding one quantized unit to the second register each time a pulse is generated in the axis direction related to said numerical value Y, and means for subtracting a predetermined value ΔR from one of the first and second registers each time the other register becomes zero.

7. A function generating system for generating a function in the form of group circles mutually contacting at an origin and having a radius expanding at each quadrant by a specific value ΔR, relative to the coordinates of the center of a circle taken as an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result } \Delta')+X-Y & \text{(for preceding operational result } \Delta' \leq O\text{) and:} \\ \text{(preceding operational result } \Delta')-Y & \text{(for preceding operational result } \Delta'>O\text{),} \end{cases}$$

where pulse distribution is periodically carried out for the X axis, so that when said present value at Δ ≤ 0, one pulse distribution is effected for the y axis, and means for subtracting one quantized unit from the first register each time a pulse is generated in the axis direction relating to said numerical value X, and for adding one quantized unit to the second register each time a pulse is generated in the axis direction related to said numerical value Y, and means for adding said specific value ΔR to one of the first and second registers every four times the other register becomes zero.

8. A function generating system according to claim 7, and further comprising means for coupling said system to a cutting tool to control the machining of a cylindrical workpiece by controlling the cutting tool to undergo movement in the form of continuous group circles.

9. A function generating system for generating a function in the form of group circles mutually contacting at an origin and having a radius decreasing by a specific value ΔR, relative to the coordinates of the center of a circle taken as an objective value (X,Y) in a plane, a first register for storing a numerical value X, a second register for storing a numerical value Y smaller than X, a gate for passing the output of the first register when the qualitative value (positive, negative, or zero), for a preceding operational result Δ', is zero or negative, and for blocking the same when said qualitative value is positive, a complement circuit coupled to receive an output signal from the second register, an adder circuit for adding the preceding operational result Δ' and output signals from said gate and said complement circuit, and a third register having an input coupled to the output of said adder circuit for receiving the present operational result Δ therefrom and including means for storing the quantity Δ and for feeding back its own output as an input to the adder circuit for the succeeding operation, wherein the present value for Δ is determined as $$\Delta = \begin{cases} \text{(preceding operational result}\Delta')+X-Y & \text{(for preceding operational result}\Delta' \leqq O\text{) and;} \\ \text{(preceding operational result}\Delta')-Y & \text{(for preceding operational result}\Delta'>O\text{),} \end{cases}$$

where pulse distribution is periodically carried out for the X axis, so that when said present value at Δ ≦ ), one pulse distribution is effected for the Y axis, and means for subtracting one quantized unit from the first register each time a pulse is generated in the axis direction relating to said numerical value X, and for adding one quantized unit to the second register each time a pulse is generated in the axis direction related to said numerical value Y, and means for subtracting said specific value ΔR from one of the first and second registers every four times the other register becomes zero.

10. A function generating system according to claim 9, and further comprising means for coupling said system to a cutting tool to control the machining of a conical workpiece by controlling the cutter tool to undergo movement in the form of continuous group circles.

* * * * *

UNITED STATES PATENT OFFICE
CERTIFICATE OF CORRECTION

Patent No. 3,917,932 Dated November 4, 1975

Inventor(s) NOBUO SAITA, YOICHI TANAKA

It is certified that error appears in the above-identified patent and that said Letters Patent are hereby corrected as shown below:

Column 2, line 60; delete "ward" and insert --ware--;

Column 3, line 4; after "cutting" (first occurrence) insert --of--;

Column 4, Eq. 3; change " $\sum_{y=o}^{y} b_y$ " to read -- $\sum_{j=o}^{y} b_j$ --.

Column 6, line 66; change "coodi-" to -- coordi- --.

Column 7, line 51; delete "also" (second occurrence).

Column 8, Eq. 12; change " $\sum_{y=o}^{y} b_y$" to read -- $\sum_{j=o}^{y} b_j$ --.

Column 8, line 32; change "= 1" to -- = +1 --.

Column 8, line 34, change "= 1" to -- = +1 --.

Column 9, line 12, change "dy = 1" to --dy = "1"--.

Column 9, line 30, change "dx = 1, dy = 1" to --dx = "1", dy = "1"--

Column 9, line 33, change "Y-i" to --Y-1--.

Column 10, Eq. 24, "x - Y" should read --X - Y--.

Column 11, line 34, delete "with" and insert --will--.

Column 13, line 33, delete "X and y " and insert --$X^{\emptyset}$ and $Y^{\emptyset}$ --.

UNITED STATES PATENT OFFICE

CERTIFICATE OF CORRECTION

Patent No. 3,917,932 Dated November 4, 1975

Inventor(s) NOBUO SAITA, YOICHI TANAKA

It is certified that error appears in the above-identified patent and that said Letters Patent are hereby corrected as shown below:

Column 14, line 11, change "has" to --as--.

Column 14, line 41, change "machanism" to --mechanism--.

Column 15, line 33, change "R" to --ΔR--.

Column 17, line 50, change "(ΔR>O) to read --(ΔR<O)--.

Column 19, delete "to" in Eq. 33.

Column 19, line 35, delete "compound" and insert --command--.

Column 22, line 21, delete ")".

Column 22, line 64, change "y" to --Y--.

Column 24, line 14, delete ")".

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*